United States Patent
Nozoe

(10) Patent No.: US 9,911,076 B2
(45) Date of Patent: Mar. 6, 2018

(54) RECTIFICATION CIRCUIT, POWER SOURCE CIRCUIT, AND RFID TAG

(71) Applicant: FUJITSU SEMICONDUCTOR LIMITED, Yokohama-shi, Kanagawa (JP)

(72) Inventor: Koji Nozoe, Yokohama (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 147 days.

(21) Appl. No.: 15/086,863

(22) Filed: Mar. 31, 2016

(65) Prior Publication Data

US 2016/0307086 A1   Oct. 20, 2016

(30) Foreign Application Priority Data

Apr. 14, 2015  (JP) .................. 2015-082652

(51) Int. Cl.
| | |
|---|---|
| G06K 19/06 | (2006.01) |
| G06K 19/07 | (2006.01) |
| H02M 1/32 | (2007.01) |
| H02M 7/10 | (2006.01) |

(52) U.S. Cl.
CPC .......... *G06K 19/0715* (2013.01); *H02M 1/32* (2013.01); *H02M 7/10* (2013.01)

(58) Field of Classification Search
CPC ........... G06K 19/0701; G06K 19/0715; G06K 19/0723; G06K 7/10009; H01Q 1/2225; H01Q 1/248; H04B 5/0068; H04B 5/0081; H04L 27/08; H04L 27/06; H03H 7/383; H02M 1/32; H02M 7/217
See application file for complete search history.

(56) References Cited

U.S. PATENT DOCUMENTS

| | | | |
|---|---|---|---|
| 2007/0046474 A1* | 3/2007 | Balachandran .... | G06K 19/0701 340/572.7 |
| 2007/0152827 A1 | 7/2007 | Song et al. | |
| 2010/0084475 A1* | 4/2010 | Hata .................. | G06K 19/0701 235/492 |

(Continued)

FOREIGN PATENT DOCUMENTS

| | | |
|---|---|---|
| JP | 2007-179534 A | 7/2007 |
| JP | 2010-108486 A | 5/2010 |
| JP | 2012-53866 A | 3/2012 |

*Primary Examiner* — Thien T Mai
(74) *Attorney, Agent, or Firm* — Westerman, Hattori, Daniels & Adrian, LLP

(57) ABSTRACT

A rectification circuit has a first terminal to which an alternating-current voltage is input from an antenna, a second terminal to which a direct-current voltage is input from the antenna, a first rectification element, a second rectification element, and a voltage rectification circuit. The first rectification element is connected between the first terminal and the second terminal, causes a current to flow in a first direction from the first terminal to the second terminal, and cuts off a current in a second direction from the second terminal to the first terminal. The second rectification element is connected between the first terminal and the second terminal, causes a current to flow in the second direction, and cuts off a current in the first direction. The voltage rectification circuit outputs a rectified voltage obtained by rectifying a voltage that is input between the first terminal and the second terminal.

9 Claims, 18 Drawing Sheets

(56) References Cited

U.S. PATENT DOCUMENTS

| | | |
|---|---|---|
| 2012/0032785 A1 | 2/2012 | Kamata |
| 2015/0098528 A1* | 4/2015 | Nowottnick ......... H04B 5/0068 375/320 |
| 2015/0372541 A1* | 12/2015 | Guo ........................ H02M 1/32 307/104 |

* cited by examiner

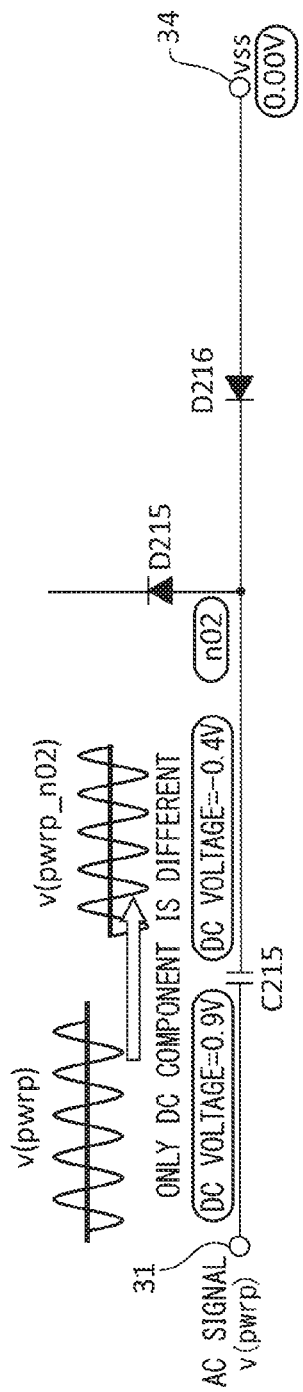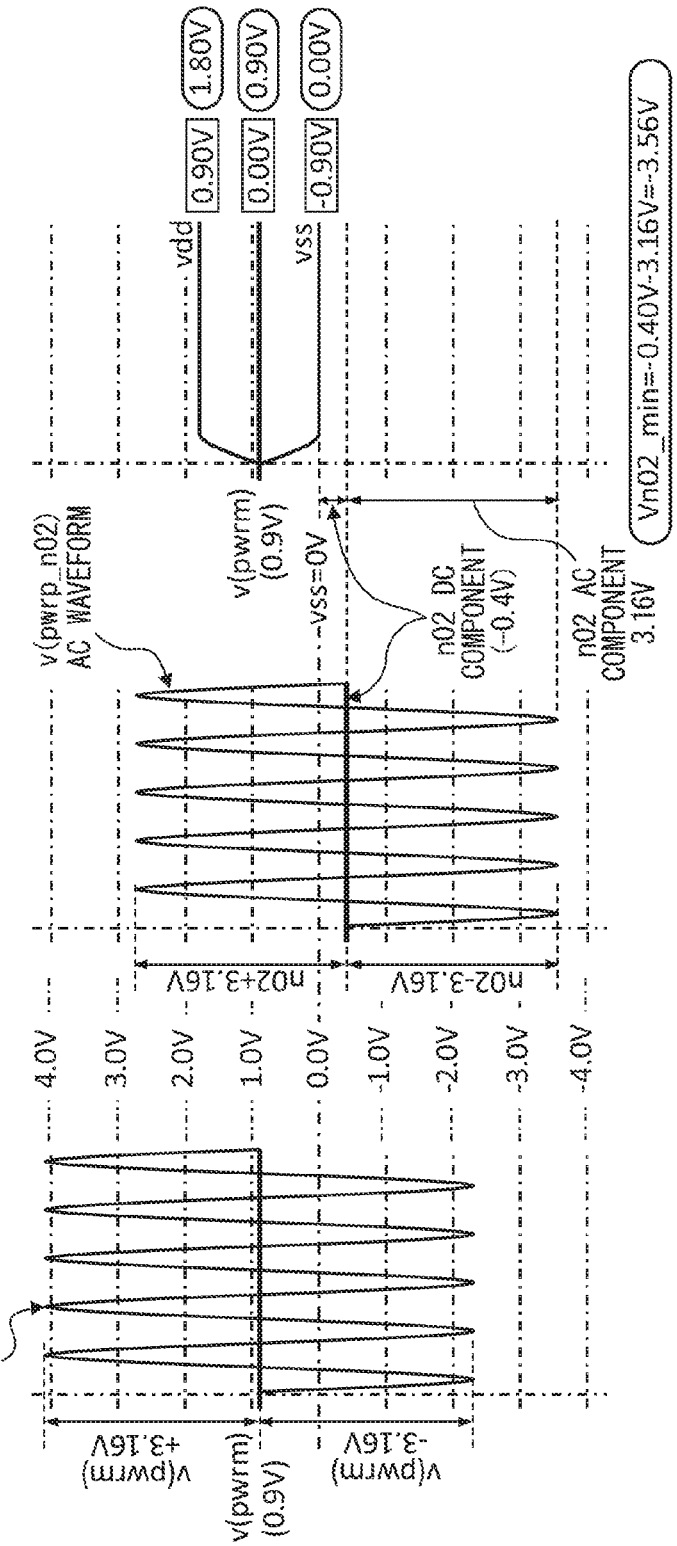
FIG. 9A
FIG. 9B

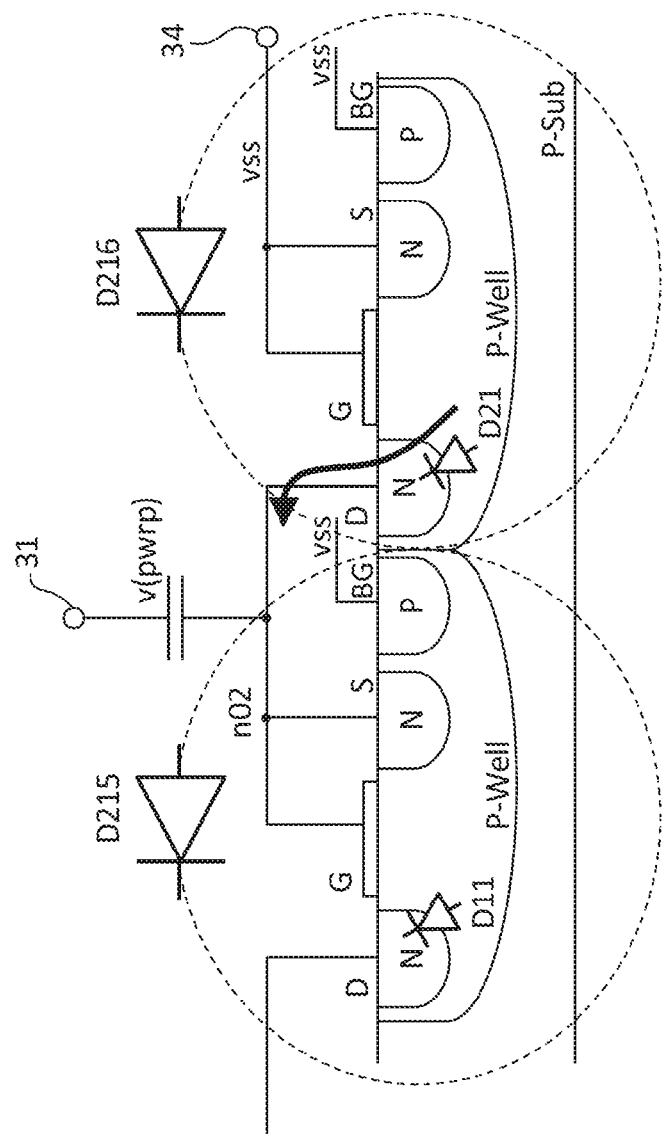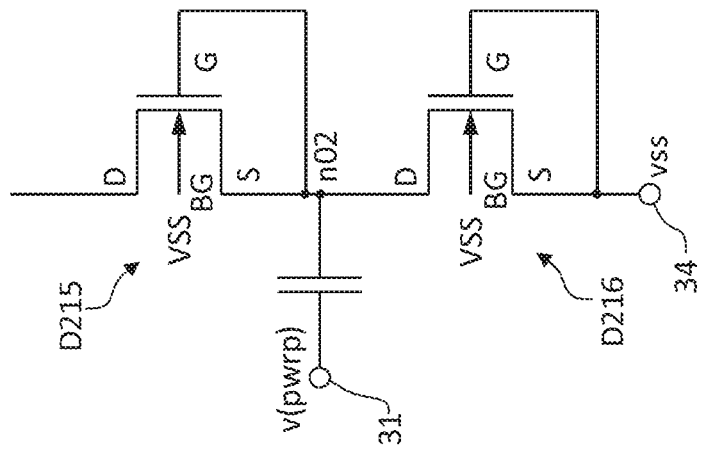

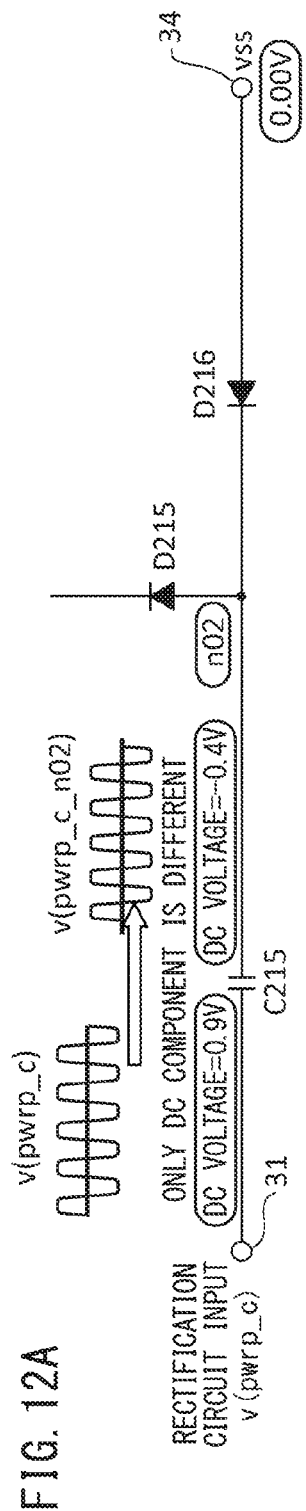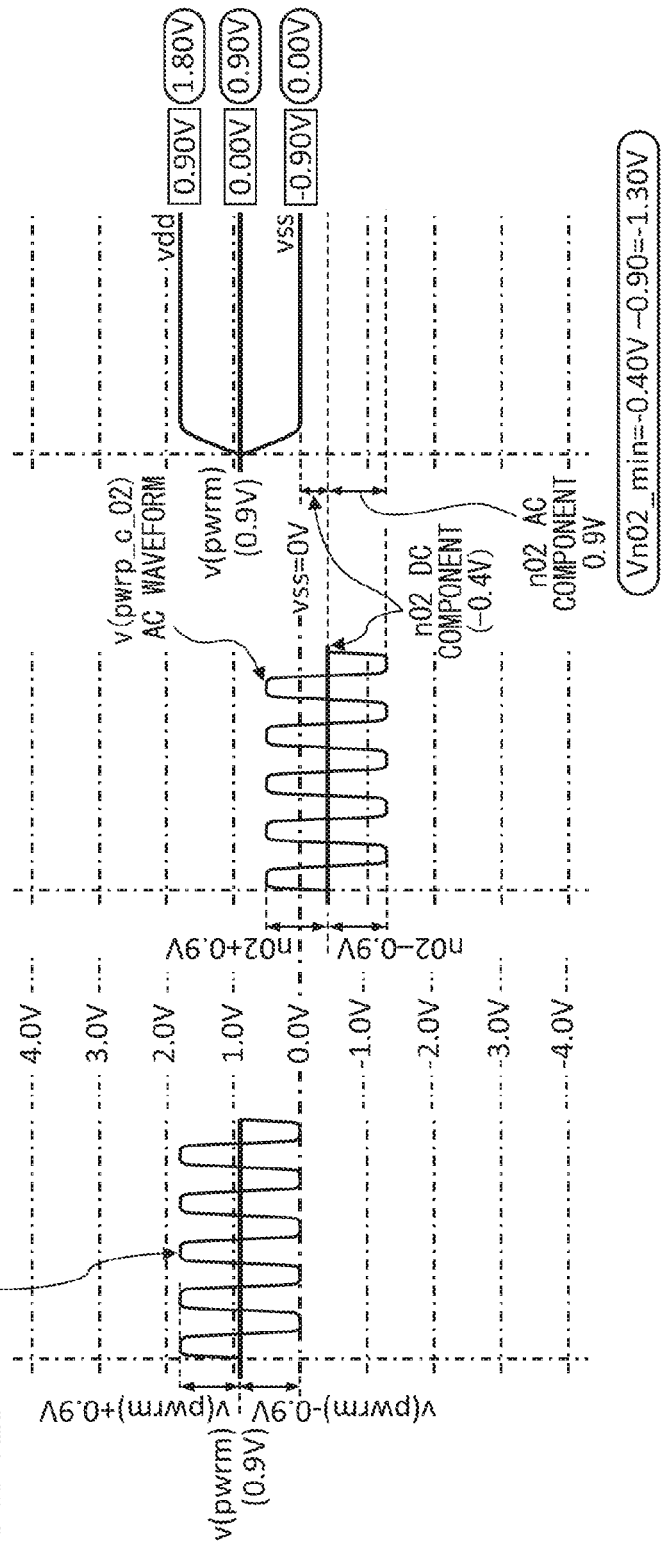
FIG. 12A
FIG. 12B

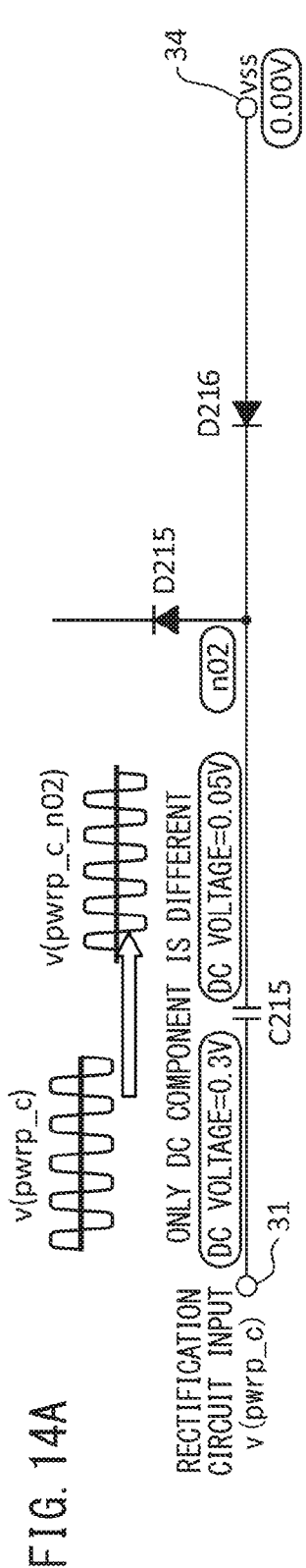
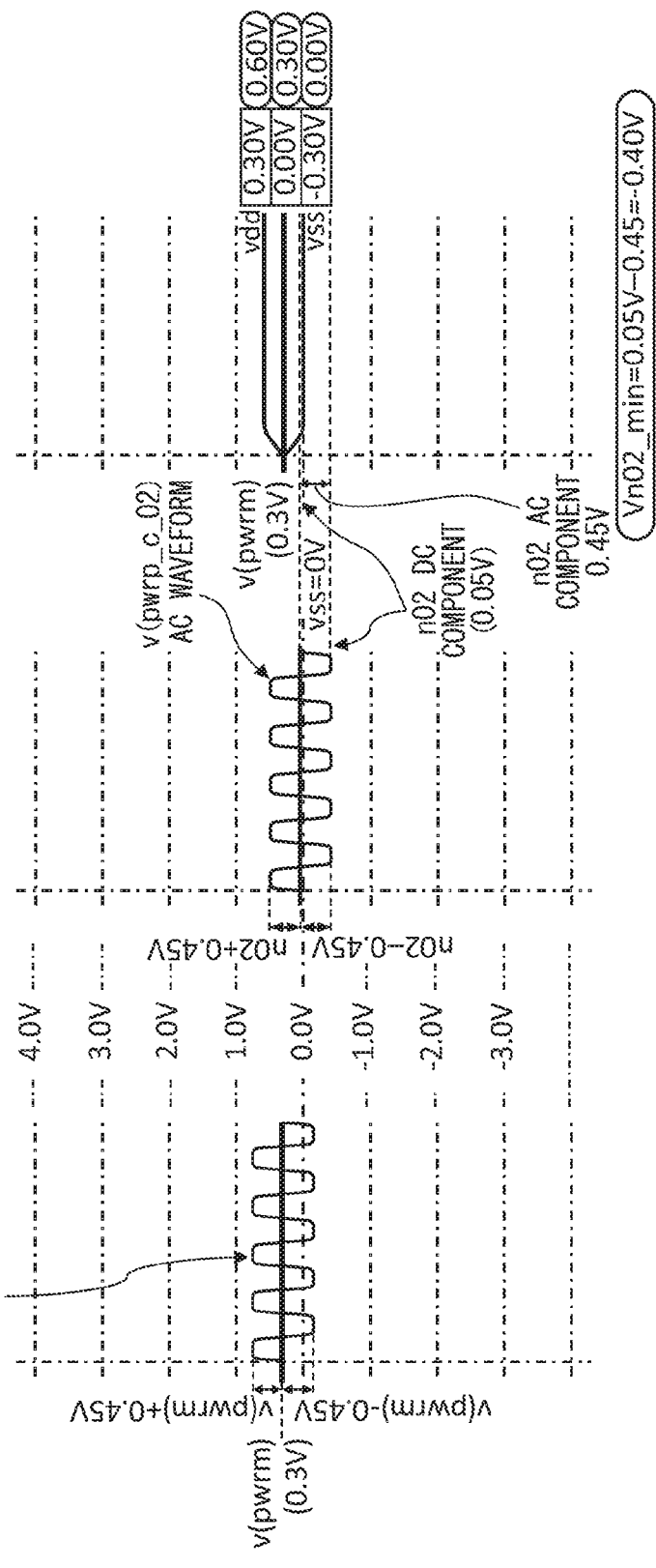
FIG. 14A
FIG. 14B

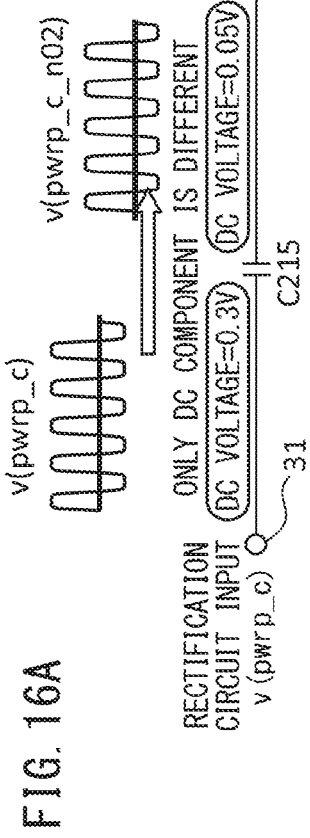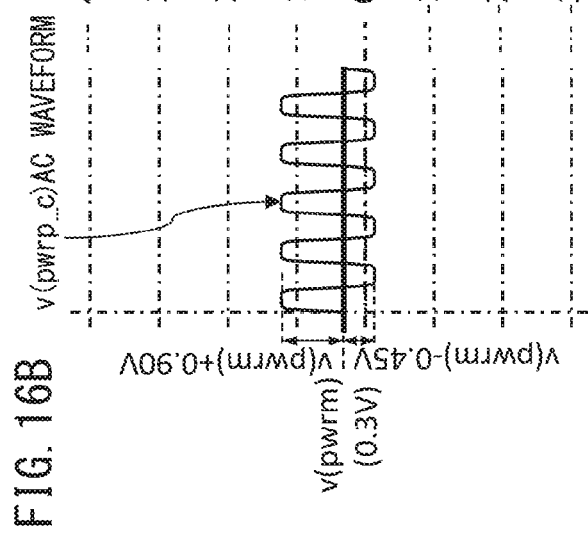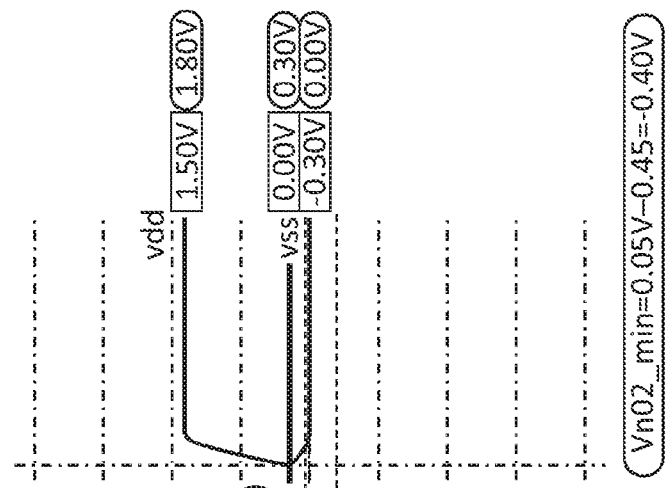
FIG. 16A
FIG. 16B

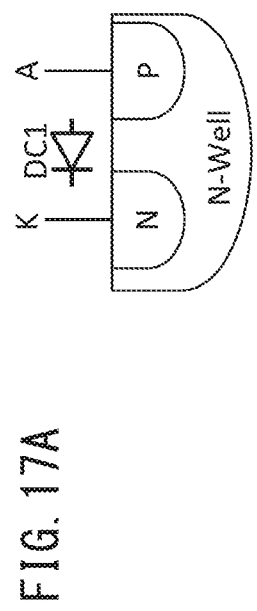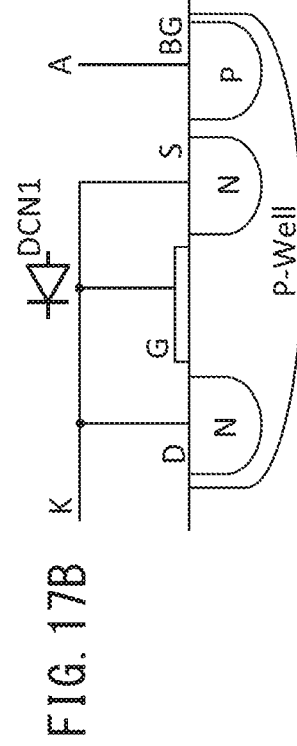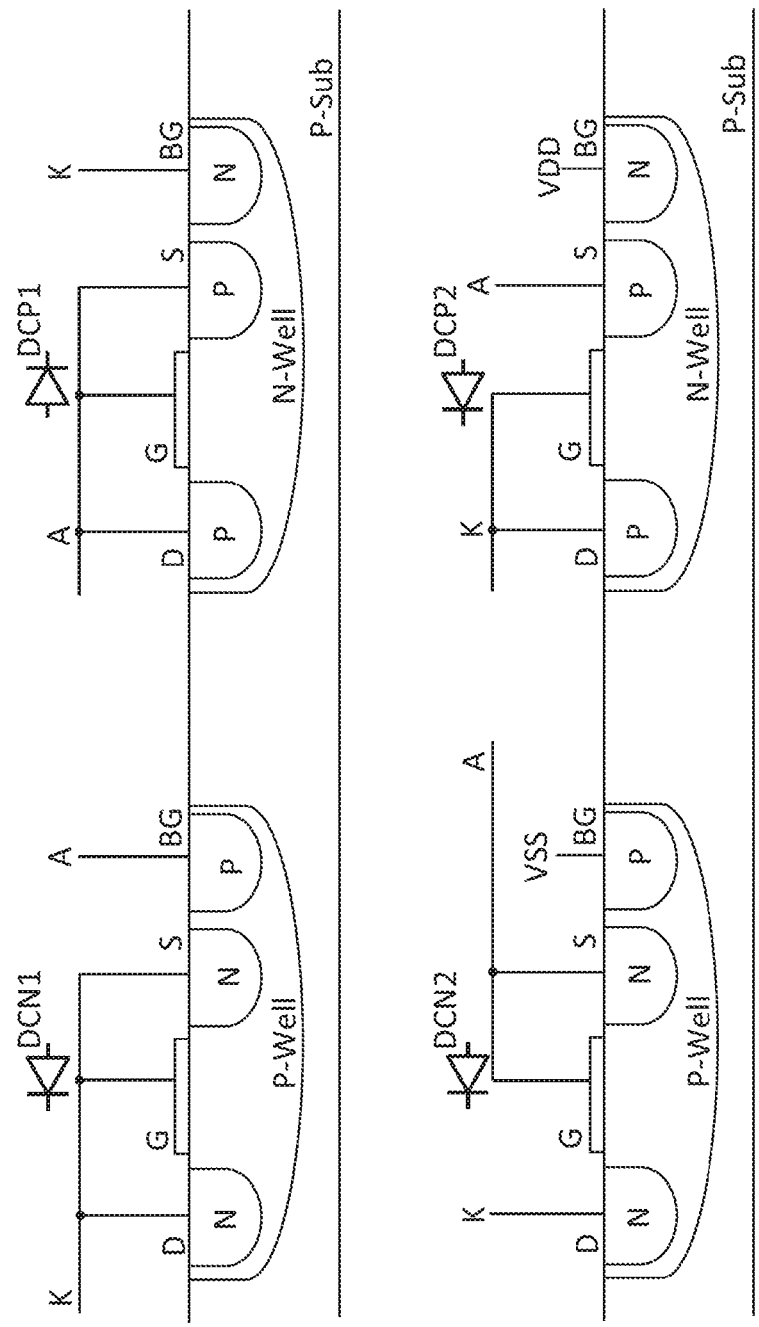
FIG. 17A
FIG. 17B
FIG. 17C

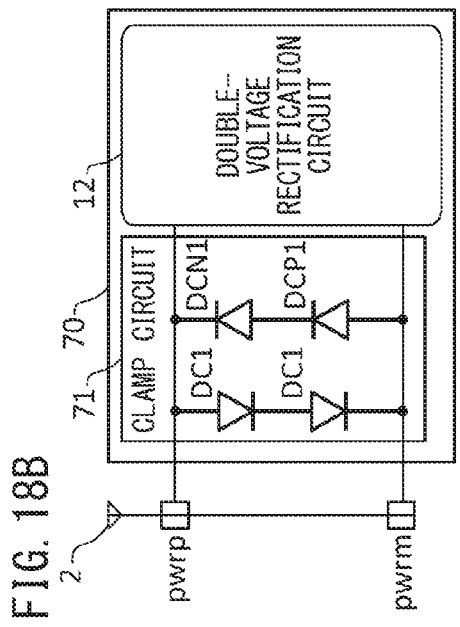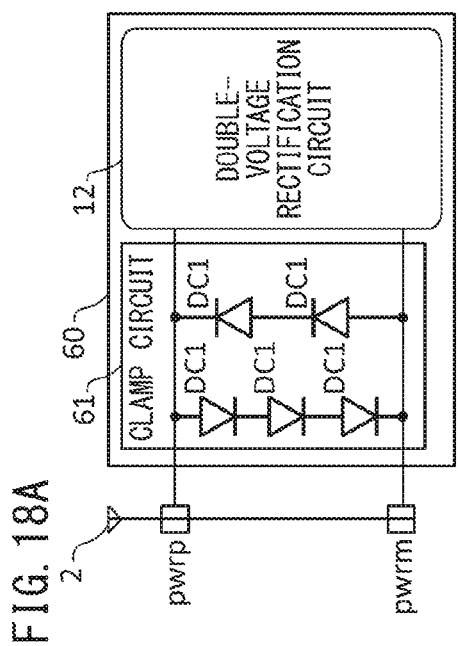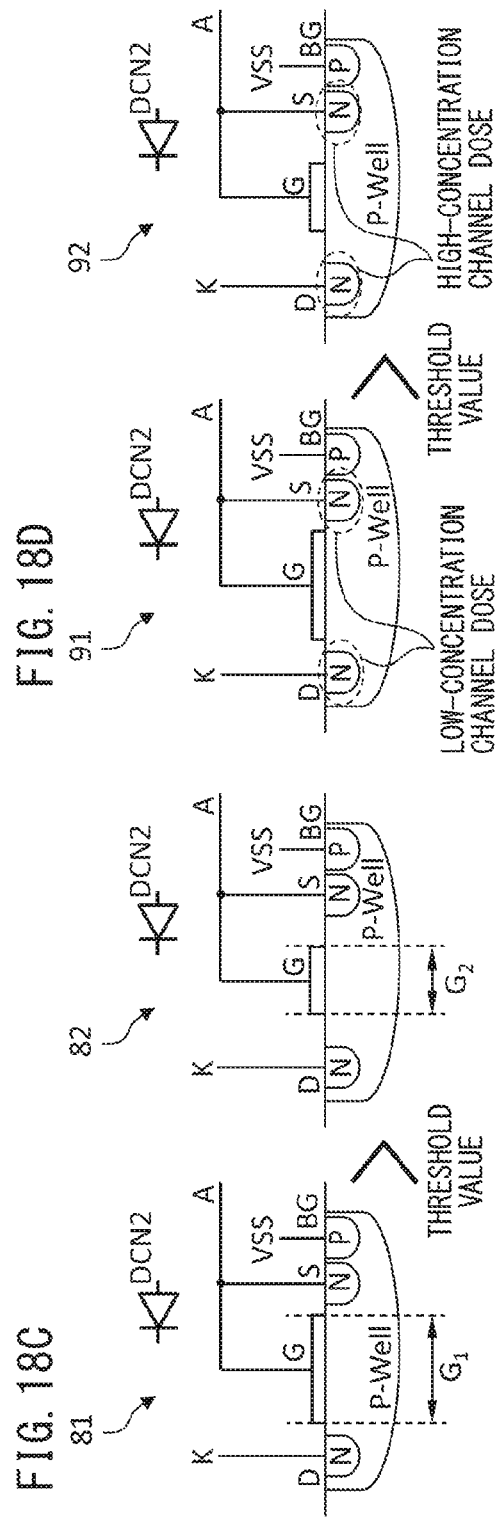

US 9,911,076 B2

RECTIFICATION CIRCUIT, POWER SOURCE CIRCUIT, AND RFID TAG

CROSS-REFERENCE TO RELATED APPLICATION

This application is based upon and claims the benefit of priority of the prior Japanese Patent Application No. 2015-82652, filed on Apr. 14, 2015, the entire contents of which are incorporated herein by reference.

FIELD

The present invention relates to a rectification circuit, a power source circuit, and an RFID tag.

BACKGROUND

An RFID (Radio Frequency Identification) tag having a rectification circuit in which a diode connected to an antenna or a diode-connected MOS transistor (hereinafter, also referred to as a diode or the like) is arranged is known (e.g., see Patent Documents 1 to 3). A diode or the like connected to an antenna turns on when the communication distance between an RFID tag and a radio communication device becomes short and a signal of a large amplitude is supplied. The voltage that is rectified by the rectification circuit of the RFID tag is limited to a threshold voltage when the diode or the like turns on. The voltage that is rectified by the rectification circuit of the RFID tag is limited by arranging the diode or the like connected to the antenna, and therefore the semiconductor element constituting the rectification circuit of the RFID tag may be prevented from deteriorating.

RELATED DOCUMENTS

[Patent Document 1] Japanese Laid Open Patent Document No. 2010-108486
[Patent Document 2] Japanese Laid Open Patent Document No. 2012-53866
[Patent Document 3] Japanese Laid Open Patent Document No. 2007-179534

SUMMARY

In an aspect, a rectification circuit has a first terminal to which an alternating-current voltage is input from an antenna, a second terminal to which a direct-current voltage is input from the antenna, a first rectification element, a second rectification element, and a voltage rectification circuit. The first rectification element is connected between the first terminal and the second terminal, causes a current to flow in a first direction from the first terminal to the second terminal, and cuts off a current in a second direction from the second terminal to the first terminal. The second rectification element is connected between the first terminal and the second terminal, causes a current to flow in the second direction, and cuts off a current in the first direction. The voltage rectification circuit outputs a rectified voltage obtained by rectifying a voltage that is input between the first terminal and the second terminal. The absolute value of a first threshold value, which is the voltage between the first terminal and the second terminal when the first rectification element causes a current to flow, is different from the absolute value of a second threshold value, which is the voltage between the first terminal and the second terminal when the second rectification element causes a current to flow.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF DRAWINGS

FIG. 9A is a partially enlarged diagram of the vicinity of the node n02 of the rectification circuit illustrated in FIG. 8A and FIG. 9B is a diagram explaining superimposition of an AC component on the node n02;

FIG. 10A is a circuit diagram at a transistor level, corresponding to the circuit block diagram in FIG. 9A and FIG. 10B is a structural section diagram of the circuit diagram illustrated in FIG. 10A;

FIG. 12A is a partially enlarged diagram of the vicinity of the node n02 of the rectification circuit illustrated in FIG. 11A and FIG. 12B is a structural section diagram of the circuit diagram illustrated in FIG. 12A;

FIG. 14A is a partially enlarged diagram of the vicinity of the node n02 of the rectification circuit illustrated in FIG.

13A and FIG. 14B is a structural section diagram of the circuit diagram illustrated in FIG. 14A;

FIG. 16A is a partially enlarged diagram of the vicinity of the node n02 of the rectification circuit illustrated in FIG. 15A and FIG. 16B is a structural section diagram of the circuit diagram illustrated in FIG. 16A;

FIG. 17A is a first example of a diode that is arranged in a clamp circuit according to an embodiment, FIG. 17B is a second example of the diode that is arranged in the clamp circuit according to the embodiment, and FIG. 17C is a third example of the diode that is arranged in the clamp circuit according to the embodiment; and FIG. 18A is a first example in which a first threshold value is made to differ from a second threshold value, FIG. 18B is a second example of a diode that is arranged in a clamp circuit according to an embodiment, FIG. 18C is a third example in which the first threshold value is made to differ from the second threshold value, and FIG. 18D is a fourth example of the diode that is arranged in the clamp circuit according to the embodiment.

DESCRIPTION OF EMBODIMENTS

Hereinafter, with reference to the drawings, a rectification circuit, a power source circuit, and an RFID tag according to the present invention are explained. However, the technical scope of the present invention is not limited to these embodiments.

Outline of Rectification Circuit According to Embodiment

It is not easy to set the amplitude of a signal, which is limited by arranging a diode or the like connected to an antenna, to an appropriate value. If the limited amplitude is too small, the circuit that is driven by the power source circuit does not operate, since the communication distance between the RFID tag and the radio communication device becomes large or the like, and therefore a sufficient voltage is not supplied to the power source circuit including the rectification circuit. Further, if the limited amplitude is too large, the circuit that is driven by the power source circuit may malfunction, since the reference voltage that is generated by the power source circuit changes.

In a rectification circuit according to an embodiment, a clamp circuit is arranged, which has a pair of rectification elements connected in opposite directions between a first terminal to which an alternating current is input from an antenna and a second terminal to which a direct current is input from the antenna, and having different threshold values. A signal whose positive amplitude and negative amplitude are different from each other may be generated by making the threshold values of the pair of rectification elements differ from each other. In the rectification circuit according to the embodiment, a sufficiently large direct-current voltage may be generated without malfunction by rectifying a signal whose positive amplitude and negative amplitude are different from each other. For example, if alternating-current signals in opposite phases are applied, each of the alternating currents is input to each of the first terminal and the second terminal from the antenna, however a signal whose positive amplitude and negative amplitude are different from each other may be generated by making the threshold values of the pair of rectification elements differ from each other. For example, an alternating current may be input to the first terminal and an alternating current whose phase is opposite to that of the alternating current that is input to the first terminal may be input to the second terminal. Further, a direct current may be input to the first terminal and an alternating current may be input to the second terminal.

In the embodiment, a rectification circuit capable of limiting the amplitude of a signal supplied from the antenna to an appropriate value may be provided.

Configuration and Function of RFID Tag According to Embodiment

Figure 1:
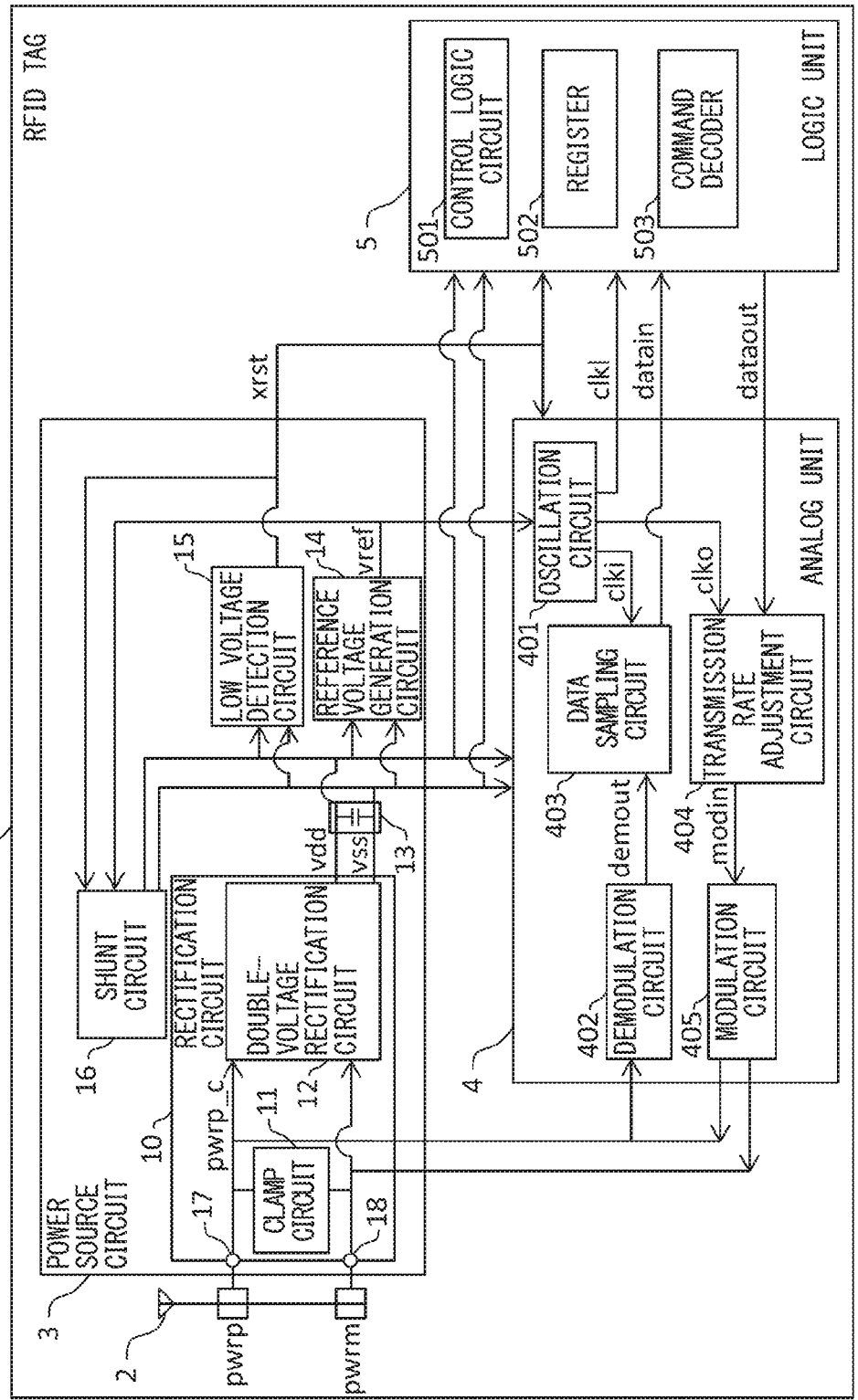
FIG. 1 is a circuit block diagram of an RFID tag according to an embodiment.

FIG. 1 is a circuit block diagram of an RFID tag according to an embodiment.

An RFID tag 1 according to the embodiment has an antenna 2, a power source circuit 3, an analog unit 4, and a logic unit 5. The antenna 2 has a first input/output unit pwrp and a second input/output unit pwrm. The first input/output unit pwrp acquires an AC signal v (pwrp) from a signal that is input from an external device, not illustrated, via the antenna 2 and the second input/output unit pwrm acquires a DC signal v (pwrm) from a signal that is input from an external device, not illustrated, via the antenna 2. The AC signal v (pwrp) is a sinusoidal wave that oscillates with the DC signal v (pwrm) as a reference and the amplitude of the AC signal v (pwrp) varies in accordance with the distance between the external device, not illustrated, and the RFID tag 1.

The power source circuit 3 has a rectification circuit 10 having a clamp circuit 11 and a double-voltage rectification circuit 12, a smoothing capacitor 13, a reference voltage generation circuit 14, a low voltage detection circuit 15, a shunt circuit 16, a first terminal 17, and a second terminal 18. The power source circuit 3 generates direct-current voltages obtained by amplifying and rectifying signals that are input from the first input/output unit pwrp and the second input/output unit pwrm of the antenna 2, and supplies the generated direct-current voltages to the analog unit 4 and the logic unit 5 as power source voltages. Further, the power source circuit 3 outputs a reset signal xrst generated by the low voltage detection circuit 15 to the analog unit 4 and the logic unit 5 as well as outputting a reference voltage vref generated by the reference voltage generation circuit 14 to the analog unit 4.

The analog unit 4 has an oscillation circuit 401, a demodulation circuit 402, a data sampling circuit 403, a transmission rate adjustment circuit 404, and a modulation circuit 405. The oscillation circuit 401 generates an input clock clki, an output clock clko, and a logic clock clkl by using the reference voltage vref that is input from the power source circuit 3. The demodulation circuit 402 demodulates signals that are input from the antenna 2 via the first input/output unit pwrp and the second input/output unit pwrm and outputs demodulated signals demout to the data sampling circuit 403. The data sampling circuit 403 outputs input data datain generated by sampling the demodulated signal demout that is input from the demodulation circuit 402 by using the input clock clki that is input from the oscillation circuit 401 to the logic unit 5. The transmission rate adjustment circuit 404 generates a modulation signal modin obtained by adjusting the transmission rate of output data dataout that is input from the logic unit 5 by using the output clock clko that is input from the oscillation circuit 401. The modulation circuit 405 modulates the modulation signal modin that is input from the transmission rate adjustment circuit 404 and outputs the modulation signal modin from the antenna 2 via the first input/output unit pwrp and the second input/output unit pwrm.

The logic unit 5 has a control logic circuit 501, a register 502, and a command decoder 503. The control logic circuit 501 performs, for example, decoding processing of the data datain that is input from the analog unit 4, encryption processing to encrypt data generated by various kinds of processing and to output the data as the output data dataout, etc. The register 502 stores data or the like that is used when the control logic circuit 501 performs various kinds of processing. The command decoder 503 recognizes a command included in the data datain that is input from the analog unit 4 and outputs the recognized command to the control logic circuit 501.

Figure 2:
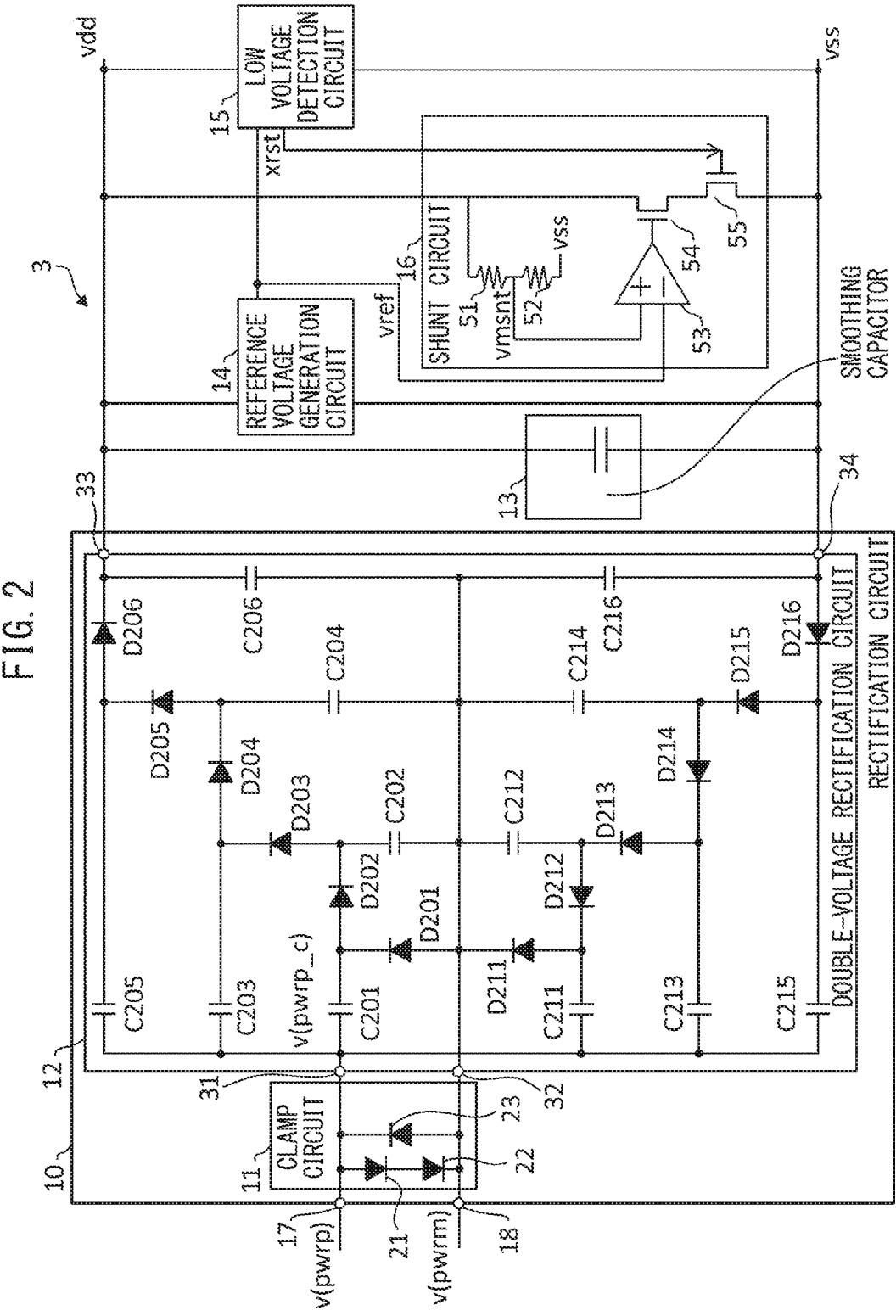
FIG. 2 is a more detailed circuit block diagram of a power source circuit illustrated in FIG. 1.

FIG. 2 is a more detailed circuit block diagram of the power source circuit 3.

The clamp circuit 11 has a first clamp diode 21, a second clamp diode 22, and a third clamp diode 23. The anode of the first clamp diode 21 is connected to the first terminal 17 and the cathode thereof is connected to the anode of the second diode, and the cathode of the second clamp diode 22 is connected to the second terminal 18. The anode of the third clamp diode 23 is connected to the second terminal 18 and the cathode thereof is connected to the first terminal 17. Each of the first clamp diode 21 to the third clamp diode 23 is a rectification element, and turns on when the potential difference between the anode and the cathode becomes greater than a clamp threshold value $V_{thc}$ and causes a forward current to flow. Further, each of the first clamp diode 21 to the third clamp diode 23 turns off when the potential difference between the anode and the cathode becomes smaller than the clamp threshold value $V_{thc}$ and cuts off the current.

The first clamp diode 21 and the second clamp diode 22 are connected in series so that the anode of the first clamp diode 21 is connected to the first terminal 17 and the cathode of the second clamp diode 22 is connected to the second terminal 18. Each of the first clamp diode 21 and the second clamp diode 22 turns on when the potential difference between the first terminal 17 and the second terminal 18 becomes greater than a first threshold value, which is twice the clamp threshold value $V_{thc}$, and causes a forward current to flow from the first terminal to the second terminal. Each of the first clamp diode 21 and the second clamp diode 22 fixes the amplitude of the AC signal v (pwrp) to the first threshold value when the potential difference between the AC signal v (pwrp) and the DC signal v (pwrm) is greater than the first threshold value.

The third clamp diode 23 turns on when the potential difference between the second terminal 18 and the first terminal 17 becomes greater than a second threshold value, which is the clamp threshold value $V_{thc}$, and causes a forward current to flow from the second terminal to the first terminal. The third clamp diode 23 fixes the value of the AC signal v (pwrp) to the second threshold value when the potential difference between the DC signal v (pwrm) that is input to the second terminal 18 and the AC signal v (pwrp) that is input to the first terminal 17 is greater than the second threshold value.

The clamp circuit 11 clamps the AC signal v (pwrp) and outputs a clamp signal v (pwrp_c) the amplitude of which in one direction is fixed so as not to exceed the first threshold value and the absolute value of the amplitude of which in the other direction is fixed so as not to exceed the second threshold value that is different from the first threshold value. For example, when the clamp threshold value $V_{thc}$ is 0.45 V, the first threshold value is 0.9 V and the second threshold value is 0.45 V.

Figure 3:
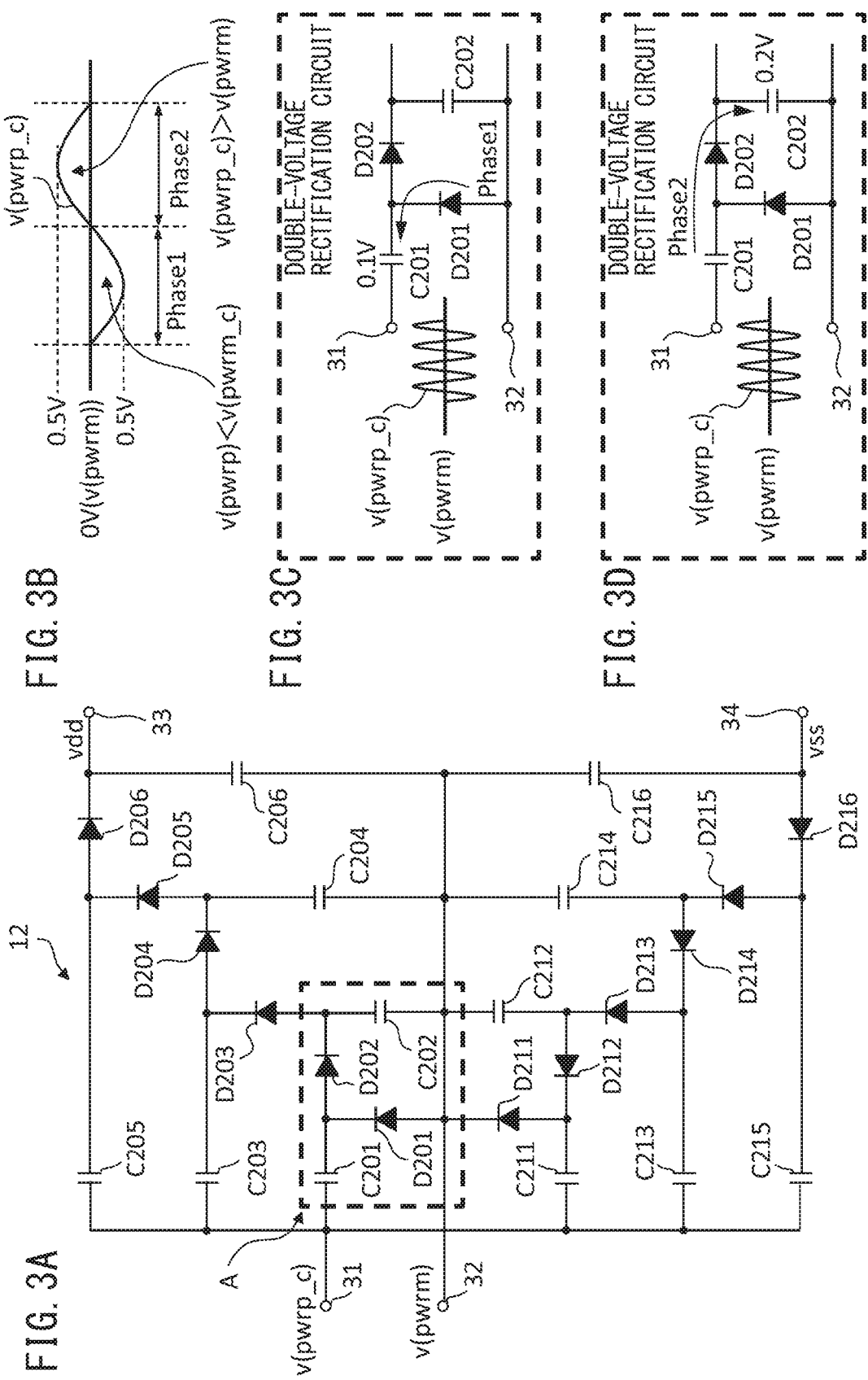
FIG. 3A is a circuit block diagram of a double-voltage rectification circuit illustrated in FIG. 1.
FIG. 3B is a diagram illustrating an example of a signal that is input to the double-voltage rectification circuit illustrated in FIG. 3A, and FIGS. 3C and 3D are each an enlarged diagram of the portion enclosed by a broken line indicated by arrow A in FIG. 3A.

FIG. 3A is a circuit block diagram of the double-voltage rectification circuit 12 and FIG. 3B is a diagram illustrating examples of the AC signal v (pwrp) and the DC signal v (pwrm) that are input to the double-voltage rectification circuit 12. FIGS. 3C and 3D are each an enlarged diagram of the portion enclosed by a broken line indicated by arrow A in FIG. 3A.

The double-voltage rectification circuit 12 has a first rectification terminal 31 to a fourth rectification terminal 34, a first step-up diode D201 to a sixth step-up diode D206, and a first step-down diode D211 to a sixth step-down diode D216. The double-voltage rectification circuit 12 further has a first step-up capacitor C201 to a sixth step-up capacitor C206 and a first step-down capacitor C211 to a sixth step-down capacitor C215. Each of the first step-up diode D201 to the sixth step-up diode D206 and the first step-down diode D211 to the sixth step-down diode D216 has a diode-connected nMOS transistor. Each of the first step-up diode D201 to the sixth step-up diode D206 and the first step-down diode D211 to the sixth step-down diode D216 turns on when the potential difference between the anode and the cathode becomes higher than a rectification threshold value $V_{thr}$ and causes a forward current to flow. Further, each of the first step-up diode D201 to the sixth step-up diode D206 and the first step-down diode D211 to the sixth step-down diode D216 turns off when the potential difference between the anode and the cathode becomes lower than the rectification threshold value $V_{thr}$ and cuts off the current.

A clamp signal v (pwrp_c) the amplitude of which is limited by the clamp circuit 11 is input to the first rectification terminal 31, and the DC signal v (pwrm) is input to the second rectification terminal 32. The third rectification terminal 33 outputs a first power source voltage vdd higher than the clamp signal v (pwrp_c) and the fourth rectification terminal 34 outputs a second power source voltage vss lower than the clamp signal v (pwrp_c).

The first step-up diode D201 to the sixth step-up diode D206 are connected in series so that the anode of the first step-up diode D201 is connected to the second rectification terminal 32 and the cathode of the sixth step-up diode D206 is connected to the third rectification terminal 33. One end of each of the first step-up capacitor C201, the third step-up capacitor C203, and the fifth step-up capacitor C205 is connected to the first rectification terminal 31. One end of each of the second step-up capacitor C202, the fourth step-up capacitor C204, and the sixth step-up capacitor C206 is connected to the second rectification terminal 32. The other end of the first step-up capacitor C201 is connected to the cathode of the first step-up diode D201 and to the anode of the second step-up diode D202. The other end of the second step-up capacitor C202 is connected to the cathode of the second step-up diode D202 and to the anode of the third step-up diode D203. The other end of the third step-up capacitor C203 is connected to the cathode of the third step-up diode D203 and to the anode of the fourth step-up diode D204. The other end of the fourth step-up capacitor C204 is connected to the cathode of the fourth step-up diode D204 and to the anode of the fifth step-up diode D205. The other end of the fifth step-up capacitor C205 is connected to the cathode of the fifth step-up diode D205 and to the anode of the sixth step-up diode D206. The other end of the sixth step-up capacitor C206 is connected to the cathode of the sixth step-up diode D206 and to the third rectification terminal 33.

The first step-down diode D211 to the sixth step-down diode D216 are connected in series so that the cathode of the first step-down diode D211 is connected to the second rectification terminal 32 and the anode of the sixth step-down diode D216 is connected to the fourth rectification terminal 34. One end of each of the first step-down capacitor C211, the third step-down capacitor C213, and the fifth step-down capacitor C215 is connected to the first rectification terminal 31. One end of each of the second step-down capacitor C212, the fourth step-down capacitor C214, and the sixth step-down capacitor C215 is connected to the second rectification terminal 32. The other end of the first step-down capacitor C211 is connected to the anode of the first step-down diode D211 and to the cathode of the second step-down diode D212. The other end of the second step-down capacitor C212 is connected to the anode of the second step-down diode D212 and to the cathode of the third step-down diode D213. The other end of the third step-down capacitor C213 is connected to the anode of the third step-down diode D213 and to the cathode of the fourth step-down diode D204. The other end of the fourth step-down capacitor C214 is connected to the anode of the fourth step-down diode D214 and to the cathode of the fifth step-down diode D215. The other end of the fifth step-down capacitor C215 is connected to the anode of the fifth step-down diode D215 and to the cathode of the sixth step-down diode D216. The other end of the sixth step-down capacitor C216 is connected to the anode of the sixth step-down diode D216 and to the fourth rectification terminal 34.

The operation of the double-voltage rectification circuit 12 is explained with reference to FIGS. 3B to 3D. In FIGS. 3B to 3D, the amplitude of the clamp voltage v (pwrp_c) is 0.5 V. It is assumed that the amplitude of the clamp voltage v (pwrp_c), which is 0.5 V, is smaller than the value to which the clamp circuit 11 limits the amplitude of a signal that is input. Further, it is also assumed that the rectification threshold value $V_{thr}$ at which the first step-up diode D201 to the sixth step-up diode D206 and the first step-down diode D211 to the sixth step-down diode D216 turn on is 0.4 V.

In FIG. 3B, in a first phase indicated by bidirectional arrow phase1, the clamp voltage v (pwrp_c) is lower than the DC voltage v (pwrm). In the first phase, the first step-up diode D201 turns on when the clamp voltage v (pwrp_c) is between −0.4 V and −0.5 V and the first step-up capacitor C201 is charged. As the amplitude of the clamp voltage v (pwrp_c) is be $V_{pwr\_amp}$, a terminal-to-terminal voltage $V_1$ of the first step-up capacitor C201 is expressed as follows.

$$V_1 = V_{pwr\_amp} - V_{thr}$$
$$= 0.5 \text{ V} - 0.4 \text{ V} = 0.1 \text{ V}$$

In FIG. 3B, in a second phase indicated by bidirectional arrow phase 2, the clamp voltage v (pwrp_c) is higher than the DC voltage v (pwrm). In the second phase, the second step-up diode D202 turns on when the clamp voltage v (pwrp_c) is between 0.4 V and 0.5 V and the second step-up capacitor C202 is charged. A terminal-to-terminal voltage $V_2$ of the second step-up capacitor C202 is expressed as follows.

$$V_2 = V_{pwr\_amp} - V_{thr} + V_1$$
$$= 0.5 \text{ V} - 0.4 \text{ V} + 0.1 \text{ V} = 0.2 \text{ V}$$

The voltage between the second rectification terminal 32 and the third rectification terminal 33 is similarly stepped up sequentially in accordance with the amplitude $V_{pwr\_amp}$ of the clamp voltage v (pwrp_c) and the rectification threshold value $V_{thr}$. A terminal-to-terminal voltage $V_N$ of the Nth step-up capacitor C20N is expressed as follows.

$$V_N = \Sigma(V_{pwr\_amp} - V_{thr})$$

Then, the voltage between the second rectification terminal 32 and the third rectification terminal 33, which corresponds to a terminal-to-terminal $V_6$ of the sixth step-up capacitor C206 will be $$V_6 = \Sigma(V_{pwr\_amp} - V_{thr}) = 6 \times 0.1 \text{ V} = 0.6 \text{ V}.$$

Similarly, the voltage between the second rectification terminal 32 and the fourth rectification terminal 34 will be −0.6 V, and therefore the potential difference between the second power source voltage vss, which is the output voltage of the fourth rectification terminal 34, and the first power source voltage vdd, which is the output voltage of the third rectification terminal 33, will be $$0.6 \text{ V} - (-0.6 \text{ V}) = 1.2 \text{ V}.$$

The smoothing capacitor 13 smoothes the voltage between the third rectification terminal 33 and the fourth rectification terminal 34.

Figure 4:
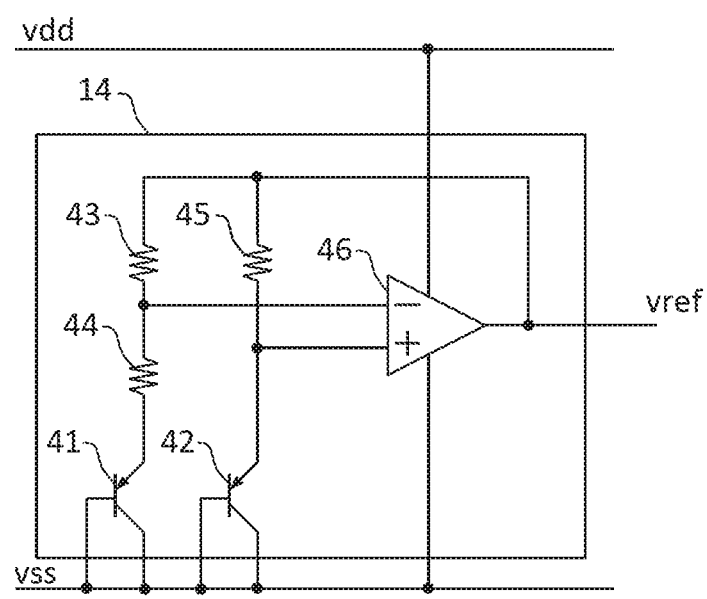
FIG. 4 is a circuit block diagram of a reference voltage generation circuit illustrated in FIG. 1.

FIG. 4 is a circuit block diagram of the reference voltage generation circuit 14.

The reference voltage generation circuit 14 is a circuit referred to as a band gap reference (BGR). The reference voltage generation circuit 14 has a first reference transistor 41, a second reference transistor 42, a first reference resistor 43, a second reference resistor 44 connected in series to the first reference resistor 43, a third reference resistor 45, and a reference operational amplifier 46. The base and collector of the first reference transistor 41 and the second reference transistor 42 are connected to the second power source voltage vss. The emitter of the first reference transistor 41 is connected to one of the inputs of the reference operational amplifier via the second reference resistor 44 and the emitter of the second reference transistor 42 is connected to the other input of the reference operational amplifier. The reference voltage generation circuit 14 generates the reference voltage vref by making use of the band gap voltages of the first reference transistor 41 and the second reference transistor 42.

The low voltage detection circuit 15 outputs the reset signal xrst when the potential difference between the first power source voltage vdd and the second power source voltage vss becomes lower than a predetermined voltage by making use of the reference voltage vref generated by the reference voltage generation circuit 14.

The shunt circuit 16 has a first shunt resistor 51, a second shunt resistor 52, a shunt comparator 53, a first shunt transistor 54, and a second shunt transistor 55. The shunt circuit 16 prevents the potential difference between the first power source voltage vdd and the second power source voltage vss from becoming higher than a predetermined value by making use of the reference voltage vref generated by the reference voltage generation circuit 14. In an example, the shunt circuit 16 keeps the potential difference between the first power source voltage vdd and the second power source voltage vss at 1.8 V or less.

The shunt circuit 16 prevents the potential difference between the first power source voltage vdd and the second power source voltage vss from becoming higher than the predetermined value, even if the amplitude of the AC signal v (pwrp) varies, since the power that the RFID receives varies in accordance with the communication distance between the external device and the RFID tag 1.

Figure 5:
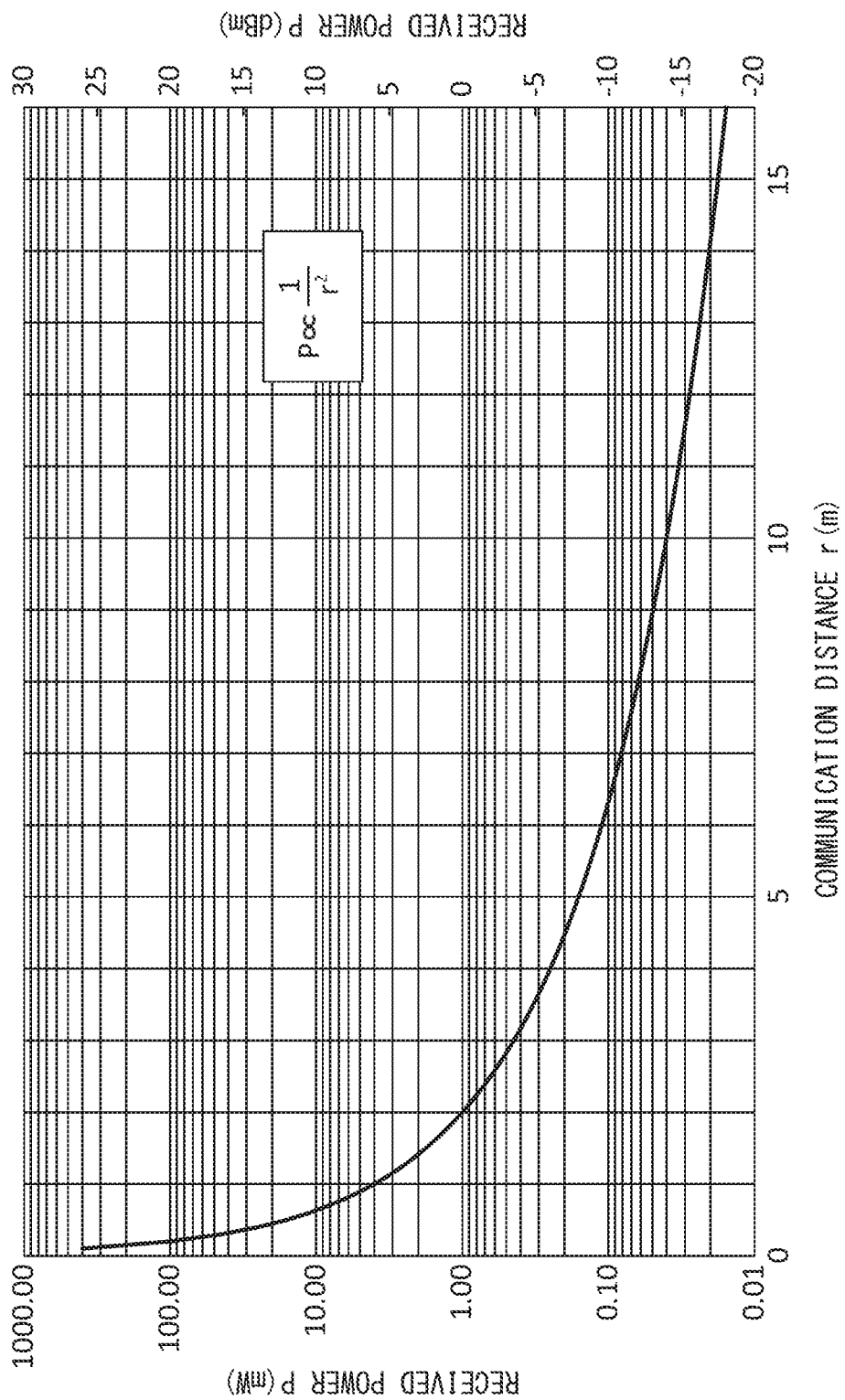
FIG. 5 is a diagram illustrating a relationship between the communication distance between an external device and the RFID tag illustrated in FIG. 1 and the received power of the RFID tag illustrated in FIG. 1.
Figure 6:
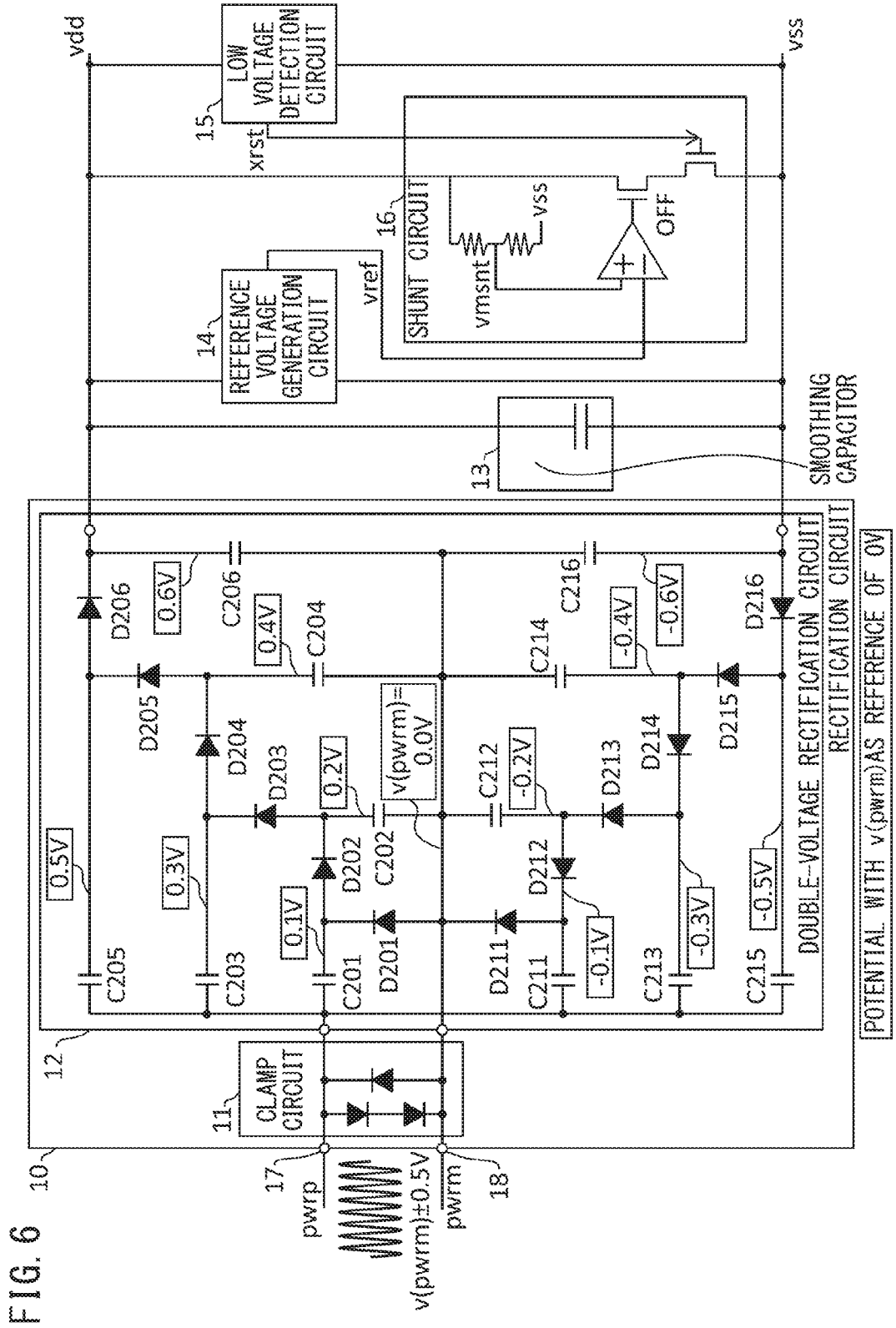
FIG. 6 is a diagram illustrating the operation of the power source circuit when the communication distance between the external device and the RFID tag illustrated in FIG. 1 is a first distance.
Figure 7:
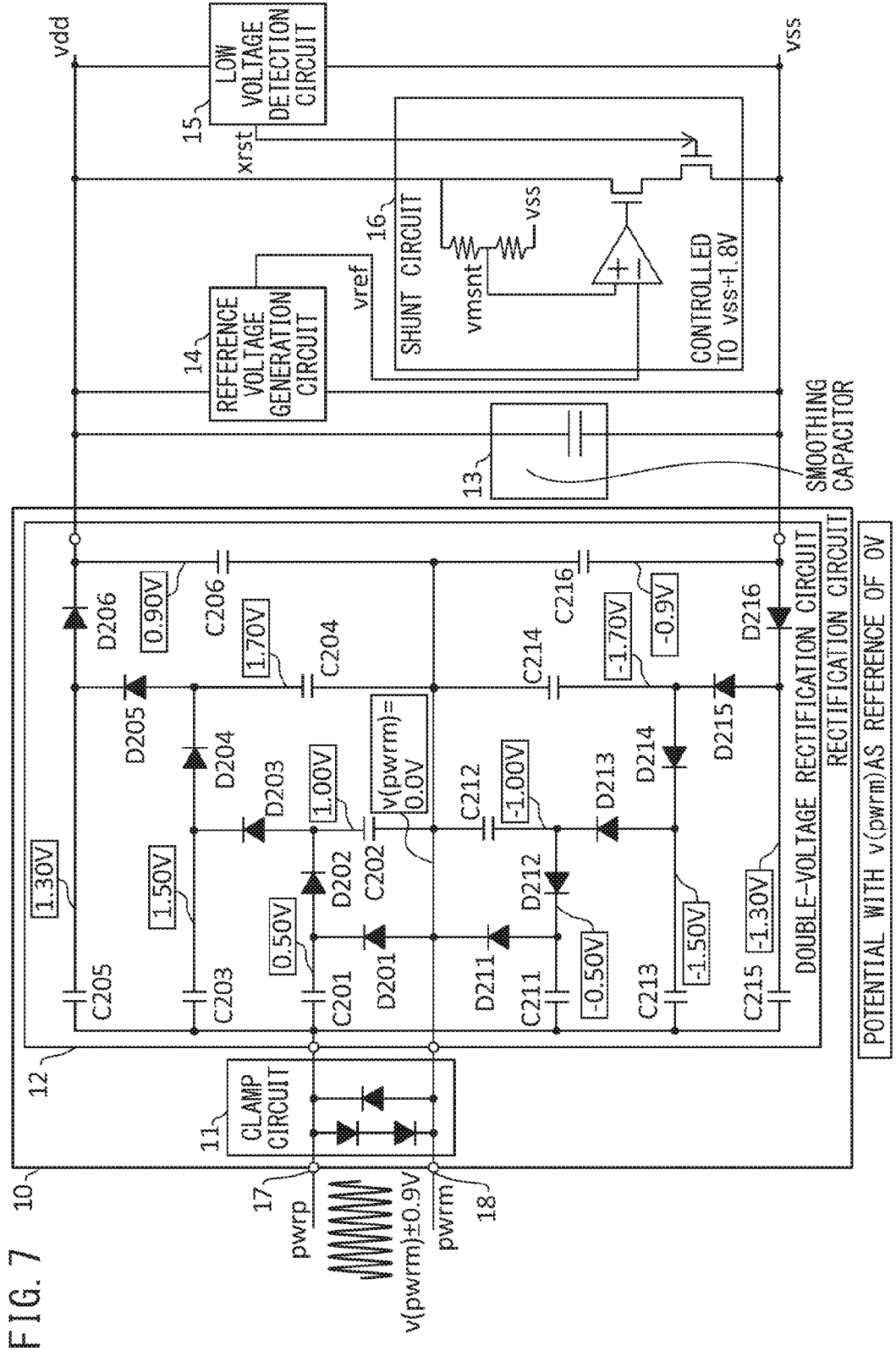
FIG. 7 is a diagram illustrating the operation of the power source circuit when the communication distance between the external device and the RFID tag illustrated in FIG. 1 is a second distance.

FIG. 5 is a diagram illustrating a relationship between the communication distance between the external device, not illustrated, and the RRID tag 1, and the received power of the RFID tag 1. In FIG. 5, the horizontal axis represents a communication distance r between the external device, not illustrated, and the RFID tag 1 and the vertical axis represents received power P of the RFID tag 1. FIG. 6 is a diagram illustrating the operation of the power source circuit 3 when the communication distance r between the external device, not illustrated, and the RFID tag 1 is a first distance and FIG. 7 is a diagram illustrating the operation of the power source circuit 3 when the communication distance r between the external device, not illustrated, and the RFID tag 1 is a second distance shorter than the first distance. In FIGS. 6 and 7, the voltage enclosed by a rectangle is the voltage with the DC signal v (pwrm) as a reference. The amplitude of the AC signal v (pwrp) in FIG. 6 is 0.5 V and the amplitude of the AC signal v (pwrp) in FIG. 7 is 0.9 V.

As illustrated in FIG. 6, when the amplitude of the AC signal v (pwrp) is 0.5 V, the potential difference between the first power source voltage vdd and the second power source voltage vss is 1.2 V, not exceeding 1.8 V, and therefore the shunt circuit 16 does not operate. On the other hand, as illustrated in FIG. 6, when the amplitude of the AC signal v (pwrp) is 0.9 V, if the shunt circuit 16 does not operate, the potential difference between the first power source voltage vdd and the second power source voltage vss exceeds 1.8 V. Thus, the shunt circuit 16 operates so as to prevent the potential difference between the first power source voltage vdd and the second power source voltage vss from exceeding 1.8 V.

When the amplitude of the AC signal v (pwrp) is comparatively small, since the communication distance between the external device and the RFID tag 1 is long, the potential difference between the first power source voltage vdd and the second power source voltage vss does not exceed 1.8 V, and therefore the shunt circuit 16 does not operate. On the other hand, when the amplitude of the AC signal v (pwrp) is comparatively large, since the communication distance between the external device and the RFID tag 1 is short and the potential difference between the first power source voltage vdd and the second power source voltage vss may exceed 1.8 V, the shunt circuit 16 operates. The shunt circuit 16 maintains the potential difference between the first power source voltage vdd and the second power source voltage vss at 1.8 V.

Function of Clamp Circuit 11

Figure 8A:
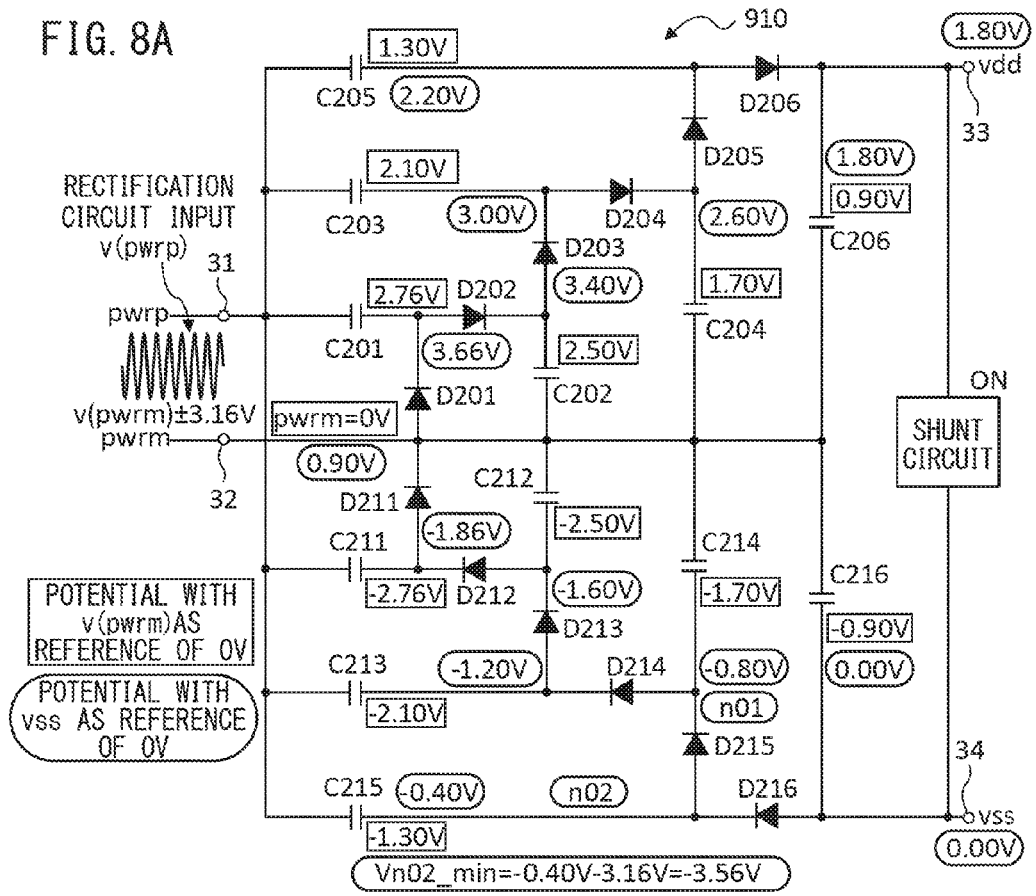
FIG. 8A is a diagram explaining a problem that occurs if a clamp circuit is not arranged and FIG. 8B is a diagram illustrating the voltage of a node n02 illustrated in FIG. 8A.
Figure 8B:
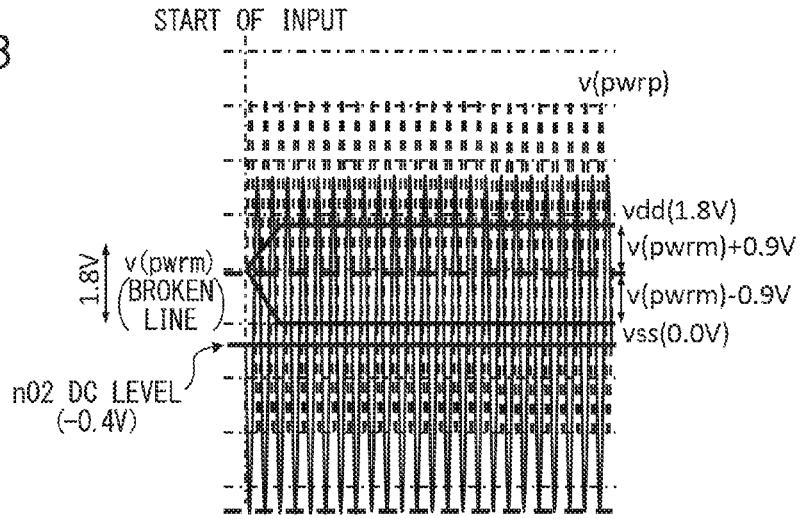

FIG. 8A is a diagram explaining a problem that occurs if the clamp circuit 11 is not arranged and FIG. 8B is a diagram illustrating the voltage of a node n02 illustrated in FIG. 8A. In FIG. 8A, the voltage enclosed by a rectangle is the voltage with the DC signal v (pwrm) as a reference and the voltage enclosed by an ellipse is the voltage with the second power source voltage vss as a reference. The amplitude of the AC signal v (pwrp) in FIG. 8A is 3.16 V. In FIG. 8B, the solid line indicates the waveform of the voltage of the node n02 and the broken line indicates the waveform of the AC signal v (pwrp).

A rectification circuit 910 differs from the rectification circuit 10 in not having the clamp circuit 11. Each of the components of the rectification circuit 910 has the same configuration and function as those of each of the components of the rectification circuit 10, to which the same symbol is attached, and therefore detailed explanation is omitted.

The voltage with the DC signal v (pwrm) of the node n02 as a reference, which is connected to the anode of the fifth step-down diode D215, the cathode of the sixth step-down diode D216, and the sixth step-down capacitor C216 of the rectification circuit, is −1.30 V. On the other hand, the voltage with the DC signal v (pwrm) as a reference of the second power source voltage vss that is applied to the fourth rectification terminal 34 connected to the anode of the sixth step-down diode D216 is −0.90 V. Thus, the potential difference in the DC component between the anode and the cathode of the sixth step-down diode D216 is 0.40 V. However, the node n02 is superimposed by the AC component having the amplitude of the AC signal v (pwrp) via the sixth step-down capacitor C216.

FIG. 9A is a partially enlarged diagram of the vicinity of the node n02 of the rectification circuit 910 and FIG. 9B is a diagram explaining superimposition of the AC component on the node n02. The diagram on the left in FIG. 9B illustrates the voltage of the first rectification terminal 31, the diagram at the center illustrates the voltage of the node n02, and the diagram on the right illustrates the voltage v (pwrm) of the second rectification terminal 32, the first power source voltage vdd of the third rectification terminal 33, and the second power source voltage vss of the fourth rectification terminal 34.

As illustrated in FIG. 9A, the node n02 is connected with the first rectification terminal 31, to which the AC signal v (pwrp) is input, via the sixth step-down capacitor C216. The voltage v (pwrm) of the second rectification terminal 32 has the DC component of 0.9 V and the AC component the amplitude of which is 3.16 V for the second power source voltage vss that is applied to the fourth rectification terminal 34. The voltage of the node n02 is superimposed by the AC component of the voltage v (pwrm) of the second rectification terminal 32 via the sixth step-down capacitor C216, and therefore has the DC component of −0.4 V and the AC component the amplitude of which is 3.16 V. Thus, the voltage of the node n02 has a potential difference of 3.56 V (=0.4+3.16) at the maximum for the second power source voltage vss that is applied to the fourth rectification terminal 34.

In the rectification circuit 910 not having the clamp circuit 11, the voltage of the node n02 has a potential difference of 3.56 V at the maximum for the second power source voltage vss, and therefore the sixth step-down diode D216 may be broken, since a high voltage is applied. Further, in the rectification circuit 910, in order to prevent the sixth step-down diode D216 from being broken, a protective element for protecting the sixth step-down diode D216 is arranged, and therefore the circuit may become complicated. Furthermore, in the rectification circuit 910, a current flows via a parasitic diode that is formed in the transistor forming the six step-down diode D216, and therefore the substrate voltage may vary.

FIG. 10A is a circuit diagram at a transistor level, corresponding to the circuit block diagram in FIG. 9A, and FIG. 10B is a structural section diagram of the circuit diagram illustrated in FIG. 10A.

The fifth step-down diode D215 and the sixth step-down diode D216 are each a diode-connected nMOS transistor the gate and source of which are connected to each other.

When the voltage of the node n02 between the fifth step-down diode D215 and the sixth step-down diode D216 drops for the second power source voltage vss, a parasitic diode D21 that is formed between the P well and the drain of the sixth step-down diode D216 turns on. In an example, the threshold value of the parasitic diode D21 is about 0.7 V and when a voltage v (pwrp_n02) of the node n02 becomes lower than the second power source voltage vss by 0.7 V or more, the parasitic diode D21 turns on. When the parasitic diode D21 turns on, the second power source voltage vss connected to the P well and the P substrate becomes a value that is the sum of the voltage v (pwrp_n02) of the node n02 and the threshold value of the parasitic diode D21. As described above, when the voltage v (pwrp_n02) of the node n02 becomes lower than the second power source voltage vss by the threshold value of the parasitic diode D21 or more, such a problem occurs that the second power source voltage vss and the substrate voltage drop.

When the second power source voltage vss and the substrate voltage vary, the emitter voltage of the first reference transistor 41 and the second reference transistor 42 of the reference voltage generation circuit 14 vary, and therefore the reference voltage vref that is output from the reference voltage generation circuit 14 varies. If the reference voltage vref varies, the voltages that are output from the low voltage detection circuit 15 and the shunt circuit 16 respectively vary, which use the reference voltage vref, and therefore the RFID tag 1 may malfunction. Such a problem may be resolved by arranging a clamp circuit between the first rectification terminal 31 and the second rectification terminal 32, which limits the amplitude of the AC signal v (pwrp) so that the voltage between the first power source voltage vdd and the second power source voltage vss becomes a desired value.

Figure 11A:
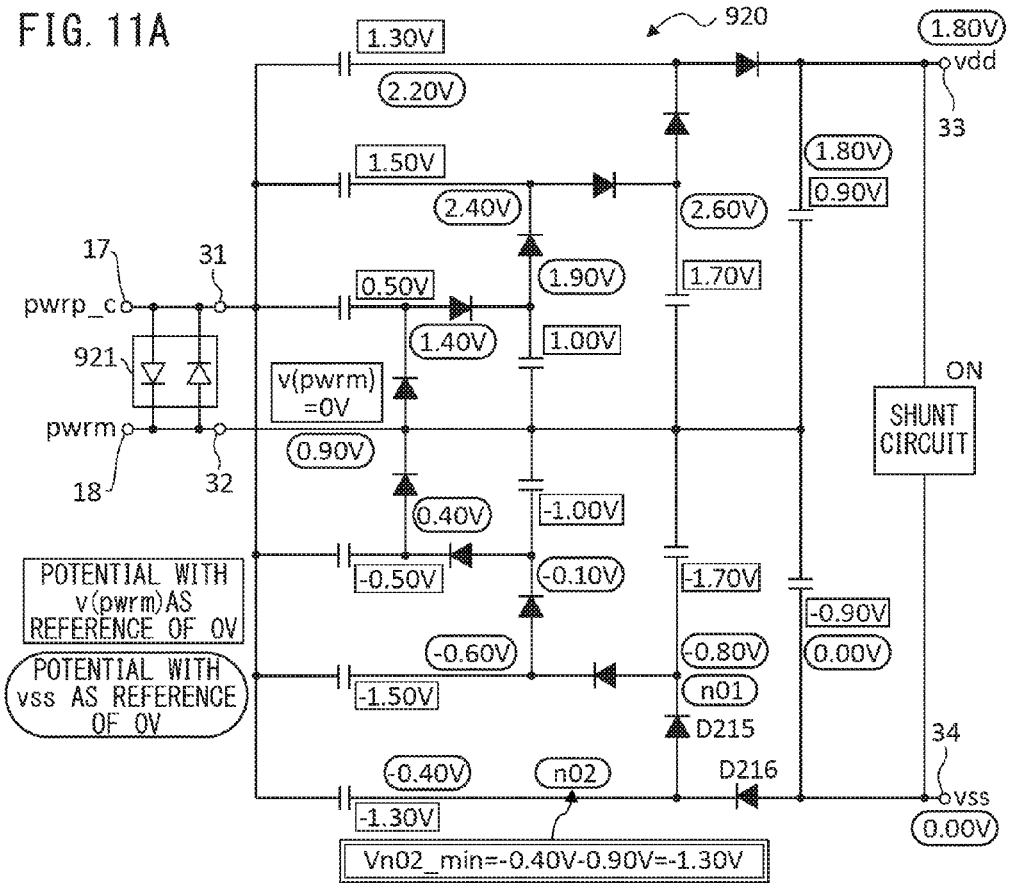
FIG. 11A is a circuit block diagram of a rectification circuit having a clamp circuit that limits the amplitude of an AC signal so that the voltage between a first power source voltage and a second power source voltage becomes a desired value and FIG. 11B is a diagram illustrating the voltage of the node n02 illustrated in FIG. 11A.
Figure 11B:
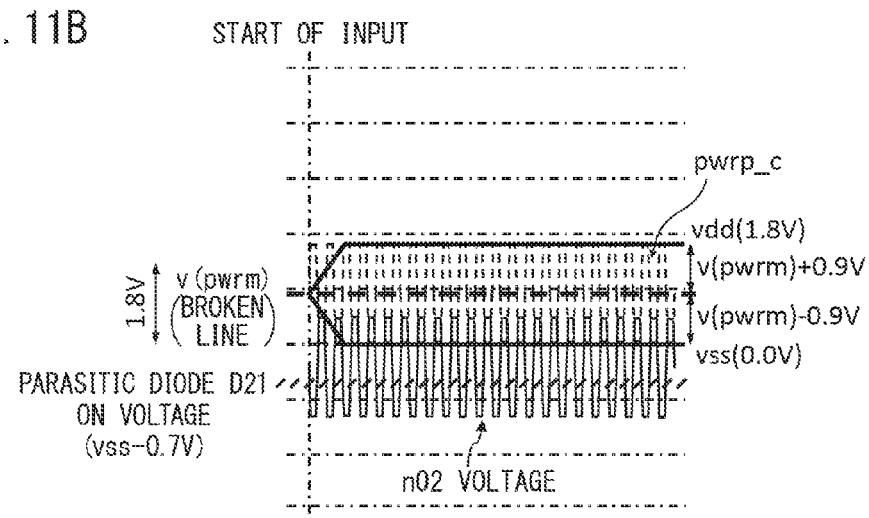

FIG. 11A is a circuit block diagram of a rectification circuit having a clamp circuit that limits the amplitude of the AC signal v (pwrp) so that the voltage between the first power source voltage vdd and the second power source voltage vss becomes a desired value, and FIG. 11B is a diagram illustrating the voltage of the node n02 illustrated in FIG. 11A. FIG. 12A is a partially enlarged diagram of the vicinity of the node n02 of the rectification circuit illustrated in FIG. 11A and FIG. 12B is a diagram explaining superimposition of the AC component on the node n02. In FIG. 11A, the voltage enclosed by a rectangle is the voltage with the DC signal v (pwrm) as a reference and the voltage enclosed by an ellipse is the voltage with the second power source voltage vss as a reference. In FIG. 11B, the solid line indicates the waveform of the voltage of the node n02 and the broken line indicates the waveform of the clamp signal v (pwrp_c) having clamped the AC signal v (pwrp). The diagram on the left in FIG. 12B illustrates the voltage of the first rectification terminal 31, the diagram at the center illustrates the voltage of the node n02, and the diagram on the right illustrates the voltage v (pwrm) of the second rectification terminal 32, the first power source voltage vdd of the third rectification terminal 33, and the second power source voltage vss of the fourth rectification terminal 34.

A rectification circuit 920 differs from the rectification circuit 10 in having a clamp circuit 921 in place of the clamp circuit 11. Each of the components of the rectification circuit 920 other than the clamp circuit 921 has the same configuration and function as those of each of the components of the rectification circuit 10 to which the same symbol is attached, and therefore detailed explanation is omitted.

The clamp circuit 921 has a first clamp diode 922 and a second clamp diode 923. The cathode of the first clamp diode 922 is connected to the first terminal 17 and the anode thereof is connected to the second terminal 18. The cathode of the second clamp diode 923 is connected to the second terminal 18 and the anode thereof is connected to the first terminal 17. Each of the first clamp diode 922 and the second clamp diode 923 turns on when the potential difference between the anode and the cathode becomes larger than a threshold value V, which is 0.9 V, and causes a forward current to flow. Further, each of the first clamp diode 922 and the second clamp diode 923 turns off when the potential difference between the anode and the cathode becomes smaller than the threshold value, which is 0.9 V, and cuts off the current. Each of the first clamp diode 922 and the second clamp diode 923 generates the clamp signal v (pwrp_c) having fixed the value of the AC signal v (pwrp) to 0.9 V when the potential difference between the AC signal v (pwrp) and the DC signal v (pwrm) is greater than 0.9 V.

The rectification circuit 920 may limit the amplitude of the AC signal v (pwrp) so that the voltage between the first power source voltage vdd and the second power source voltage vss becomes 1.8 V. However, as illustrated in FIG. 11B, FIG. 12A, and FIG. B, the voltage of the node n02 has a potential difference of 1.30 V (=0.4+0.9) at the maximum for the second power source voltage vss that is applied to the fourth rectification terminal 34. The potential difference of the node n02 for the second power source voltage vss that is applied to the fourth rectification terminal 34 is 1.30 V at the maximum, and therefore such a problem that the parasitic diode turns on and the substrate voltage varies is not resolved.

Figure 13A:
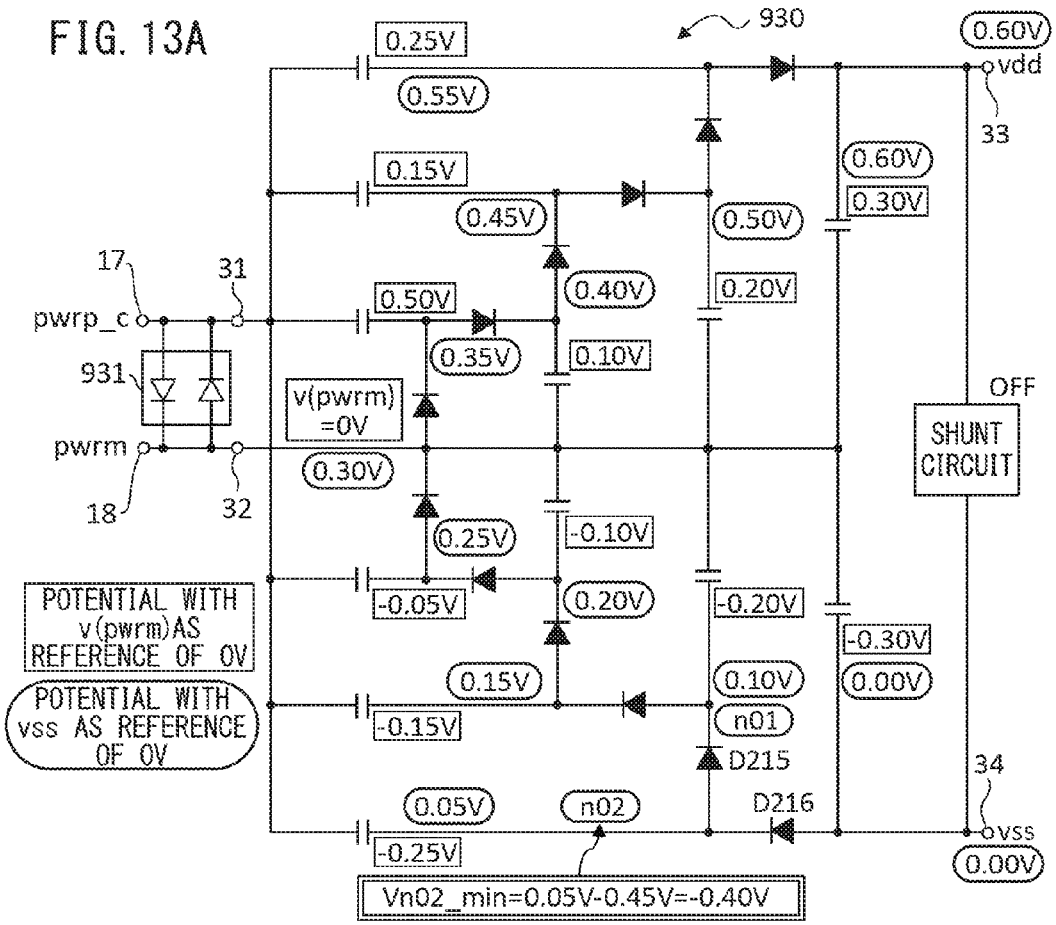
FIG. 13A is a circuit block diagram of another rectification circuit having a clamp circuit that limits the amplitude of an AC signal so that the voltage between a first power source voltage and a second power source voltage becomes a desired value and FIG. 13B is a diagram illustrating the voltage of the node n02 illustrated in FIG. 13A.
Figure 13B:
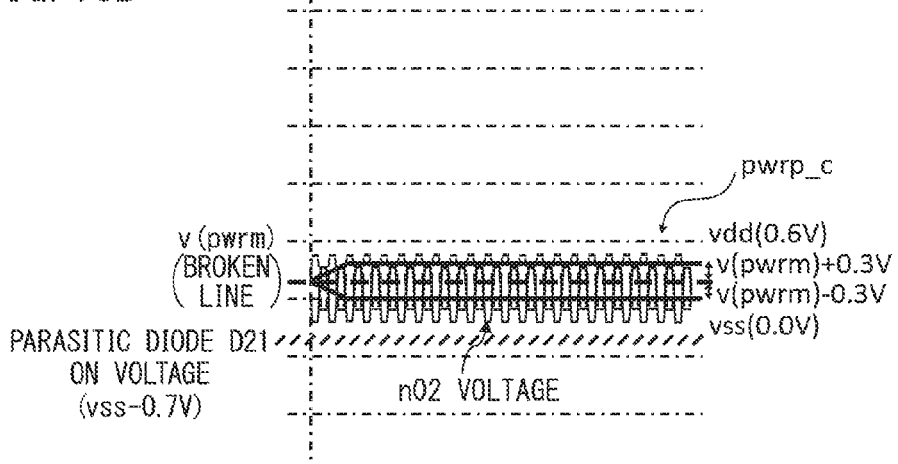

FIG. 13A is a circuit block diagram of another rectification circuit having a clamp circuit that limits the amplitude of the AC signal v (pwrp) so that the voltage between the first power source voltage vdd and the second power source voltage vss becomes a desired value and FIG. 13B is a diagram illustrating the voltage of the node n02 illustrated in FIG. 13A. FIG. 14A is a partially enlarged diagram of the vicinity of the node n02 of the rectification circuit illustrated in FIG. 13A and FIG. 14B is a diagram explaining superimposition of the AC component on the node n02. In FIG. 13A, the voltage enclosed by a rectangle is the voltage with the DC signal v (pwrm) as a reference and the voltage enclosed by an ellipse is the voltage with the second power source voltage vss as a reference. In FIG. 13B, the solid line indicates the waveform of the voltage of the node n02 and the broken line indicates the waveform of the clamp signal v (pwrp_c) having clamped the AC signal v (pwrp). The diagram on the left in FIG. 14B illustrates the voltage of the first rectification terminal 31, the diagram at the center illustrates the voltage of the node n02, and the diagram on the right illustrates the voltage v (pwrm) of the second rectification terminal 32, the first power source voltage vdd of the third rectification terminal 33, and the second power source voltage vss of the fourth rectification terminal 34.

A rectification circuit 930 differs from the rectification circuit 920 in having a clamp circuit 931 in place of the clamp circuit 921. Each of the components of the rectification circuit 930 other than the clamp circuit 931 has the same configuration and function as those of each of the components of the rectification circuit 920, to which the same symbol is attached, and therefore detailed explanation is omitted.

The clamp circuit 931 has a first clamp diode 932 and a second clamp diode 933. Each of the first clamp diode 932 and the second clamp diode 933 differs from each of the first clamp diode 922 and the second clamp diode 923 in that the threshold value is 0.45 V, not 0.9 V.

In the rectification circuit 930, as illustrated in FIG. 13B, FIG. 14A, and FIG. 14B, the voltage of the node n02 has a potential difference of 0.40 V (=−0.05+0.45) at the maximum for the second power source voltage vss that is applied to the fourth rectification terminal 34. The potential of the node n02 for the second power source voltage vss that is applied to the fourth rectification terminal 34 is 0.40 V at the maximum, and therefore such a problem that the parasitic diode turns on and the substrate voltage varies is resolved. However, the voltage between the first power source voltage vdd and the second power source voltage vss becomes 0.60 V, which is lower than a desired value of 1.8 V, and therefore such a problem remains that the voltage between the first power source voltage vdd and the second power source voltage vss becomes lower than the desired value.

Figure 15A:
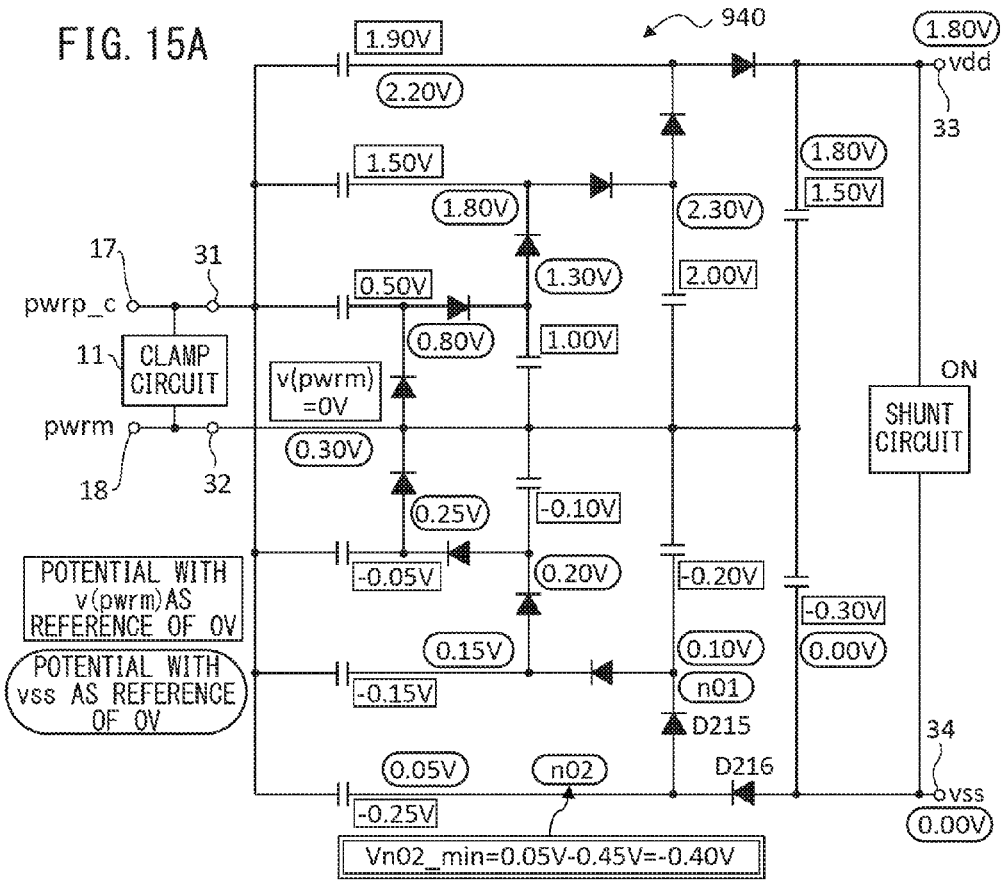
FIG. 15A is a circuit block diagram of the rectification circuit illustrated in FIG. 1
Figure 15B:
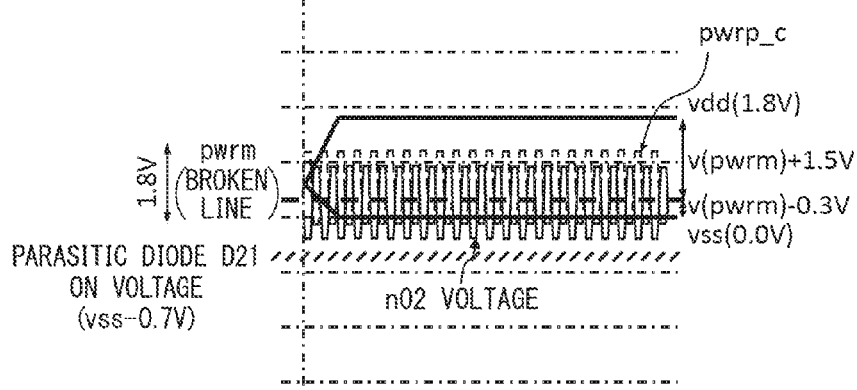
FIG. 15B is a diagram illustrating the voltage of the node n02 illustrated in FIG. 15A.

FIG. 15A is a circuit block diagram of the rectification circuit 10 according to the embodiment and FIG. 15B is a diagram illustrating the voltage of the node n02 illustrated in FIG. 15A. FIG. 16A is a partially enlarged diagram of the vicinity of the node n02 of the rectification circuit 10 and FIG. 16B is a diagram explaining superimposition of the AC component on the node n02. In the embodiment illustrated in FIG. 15A, the clamp threshold value $V_{thc}$ is 0.45 V, the first threshold value is 0.9 V, and the second threshold value is 0.45 V. In FIG. 15A, the voltage enclosed by a rectangle is the voltage with the DC signal v (pwrm) as a reference and the voltage enclosed by an ellipse is the voltage with the second power source voltage vss as a reference. In FIG. 15B, the solid line indicates the waveform of the voltage of the node n02 and the broken line indicates the waveform of the clamp signal v (pwrp_c) having clamped the AC signal v (pwrp). The diagram on the left in FIG. 16B illustrates the voltage of the first rectification terminal 31, the diagram at the center illustrates the voltage of the node n02, and the diagram on the right illustrates the voltage v (pwrm) of the second rectification terminal 32, the first power source voltage vdd of the third rectification terminal 33, and the second power source voltage vss of the fourth rectification terminal 34.

In the rectification circuit 10 according to the embodiment, as illustrated in FIG. 15B, FIG. 16A, and FIG. 16B, the voltage of the node n02 has a potential difference of 0.40 V (=−0.05+0.45) at the maximum for the second power source voltage vss that is applied to the fourth rectification terminal 34. The potential difference of the node n02 for the second power source voltage vss that is applied to the fourth rectification terminal 34 is 0.40 V at the maximum, and therefore such a problem that the parasitic diode turns on and the substrate voltage varies is resolved. Further, the rectification circuit 10 may limit the amplitude of the AC signal v (pwrp) so that the voltage between the first power source voltage vdd and the second power source voltage vss becomes 1.8 V, which is the desired value.

In the rectification circuit according to the embodiment, the clamp circuit outputs the clamp signal v (pwrm_c) the amplitude of which in one direction is fixed so as not to exceed the first threshold value and the absolute value of the amplitude of which in the other direction is fixed so as not to exceed the second threshold value that is different from the first threshold value. In the rectification circuit according to the embodiment, the two problems of preventing the substrate voltage from varying due to the parasitic diode and of generating the power source voltage of a desired value may be resolved by the double-voltage rectification circuit rectifying the signal the amplitudes of which are limited so as to be different from each other.

Modification Example of Clamp Circuit According to Embodiment

In the clamp circuit according to the embodiment, each of the first clamp diode 21, the second clamp diode 22, and the third clamp diode 23 may have diodes formed in various forms.

FIG. 17A is a first example of the diode that is arranged in the clamp circuit according to the embodiment, FIG. 17B is a second example of the diode that is arranged in the clamp circuit according to the embodiment, and FIG. 17C is a third example of the diode that is arranged in the clamp circuit according to the embodiment.

As illustrated in FIG. 17A, the diode that is arranged in the clamp circuit according to the embodiment may be a PN junction diode DC1. Further, as illustrated in FIG. 17B, the diode that is arranged in the clamp circuit according to the embodiment may be formed by making use of the PN junction between the channel diffusion and the well diffusion of a MOS transistor. a first n-channel diode DCN1 may be formed by using the back gate of an nMOS transistor as the anode and forming the cathode by short-circuiting the gate, source, and drain. Further, a first p-channel diode DCP1 may be formed by forming the anode by short-circuiting the gate, source, and drain of a pMOS transistor and using the back gate as the cathode. As illustrated in FIG. 17C, the diode that is arranged in the clamp circuit according to the embodiment may be a diode-connected MOS transistor. A second n-channel diode DCN2 may be formed by forming the anode by short-circuiting the gate and source of an nMOS transistor and using the drain as the cathode. Further, a second p-channel diode DCP2 may be formed by using the source of a pMOS transistor as the anode and forming the cathode by short-circuiting the gate and drain.

In the clamp circuit 11, the first threshold value is made to differ from the second threshold value by changing the number of stages of diode having the same threshold value. However, in the clamp circuit according to the embodiment, the first threshold value may differ from the second threshold value by another method.

FIG. 18A is a first example in which the first threshold value is made to differ from the second threshold value and FIG. 18B is a second example of the diode that is arranged in the clamp circuit according to the embodiment. FIG. 18C is a third example in which the first threshold value is made to differ from the second threshold value and FIG. 18D is a fourth example of the diode that is arranged in the clamp circuit according to the embodiment.

As illustrated in FIG. 18A, a rectification circuit 60 that is connected to the antenna 2 has a clamp circuit 61 and the double-voltage rectification circuit 12. The structure and function of the double-voltage rectification circuit 12 have been explained with reference to FIG. 3 or the like, and therefore detailed explanation of the double-voltage rectification circuit 12 is omitted. The clamp circuit 61 has the five PN junction diodes DC1. The three PN junction diodes DC1 are connected in series so that the direction from the first input/output unit pwrp to the second input/output unit pwrm is the forward direction, and the other two PN junction diodes DC1 are connected in series so that the direction from the second input/output unit pwrm to the first input/output unit pwrp is the forward direction. In the clamp circuit according to the embodiment, the first threshold value and the second threshold value may differ from each other by changing the number of stages of the PN junction diode DC1. The first n-channel diode DCN1, the first p-channel diode DCP1, the second re-channel diode DCN2, or the second p-channel diode DCP2 illustrated in FIG. 17B and FIG. 17C may be arranged in place of the PN junction diode DC1.

As illustrated in FIG. 18B, a rectification circuit 70 that is connected to the antenna 2 has a clamp circuit 71 and the double-voltage rectification circuit 12. The structure and function of the double-voltage rectification circuit 12 have been explained with reference to FIG. 3 or the like, and therefore detailed explanation of the double-voltage rectification circuit 12 is omitted. The clamp circuit 71 has the two PN junction diodes DC1 and the two first n-channel diodes DCN1. The two PN junction diodes DC1 are connected in series so that the direction from the first input/output unit pwrp to the second input/output unit pwrm is the forward direction, and the two first n-channel diodes DCN1 are connected in series so that the direction from the second input/output unit pwrm to the first input/output unit pwrp is the forward direction. In the clamp circuit according to the embodiment, the first threshold value may differ from the second threshold value by changing the kind of diode to be connected in accordance with the connection direction.

As illustrated in FIG. 18C, the first threshold value may differ from the second threshold value by changing the gate width of the MOS transistor forming the diode. A gate length $G_1$ of a first diode 81 located on the left in FIG. 18C is longer than a gate length $G_2$ of a second diode 82 located on the right in FIG. 18C, and therefore the threshold value of the first diode 81 is greater than the threshold value of the second diode 82.

As illustrated in FIG. 18D, the first threshold value may differ from the second threshold value by changing the dose amount that is implanted into the channel of the MOS transistor forming the diode. The dose amount into the channel of a first diode 91 located on the left in FIG. 18D is smaller than the dose amount into the channel of a second diode 92 located on the right in FIG. 18D, and therefore the threshold value of the first diode 91 is greater than the threshold value of the second diode 92.

All examples and conditional language provided herein are intended for pedagogical purposes of aiding the reader in understanding the invention and the concepts contributed by the inventor to furthering the art, and are to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A rectification circuit comprising:
   a first terminal to which an alternating-current voltage is input from an antenna;
   a second terminal to which a direct-current voltage is input from the antenna;
   a first rectification element that is connected between the first terminal and the second terminal, causes a current to flow in a first direction from the first terminal to the second terminal, and cuts off a current in a second direction from the second terminal to the first terminal;
   a second rectification element that is connected between the first terminal and the second terminal, causes a current to flow in the second direction, and cuts off a current in the first direction; and
   a voltage rectification circuit that outputs a rectified voltage obtained by rectifying a voltage that is input between the first terminal and the second terminal, wherein
   the absolute value of a first threshold value that is a voltage between the first terminal and the second terminal when the first rectification element causes a current to flow is different from the absolute value of a second threshold value that is a voltage between the first terminal and the second terminal when the second rectification element causes a current to flow.

2. The rectification circuit according to claim 1, wherein the first rectification element has a diode the first direction of which is the forward direction,
the second rectification element has a diode the second direction of which is the forward direction, and
the number of diodes that the first rectification element has is different from the number of diodes that the second rectification element has.

3. The rectification circuit according to claim 1, wherein the voltage rectification circuit includes:
   a plurality of step-up diodes the anode of which in the initial stage is connected to the second terminal and which is connected in series;
   a plurality of step-up capacitors each one end of which is connected to any of the plurality of step-up diodes and which sequentially steps up a difference between the amplitude of an alternating-current voltage, which is limited by a first threshold value, and a threshold value of the plurality of step-up diodes;
   a plurality of step-down diodes the cathode of which in the initial stage is connected to the second terminal and which is connected in series; and
   a plurality of step-down capacitors each one end of which is connected to any of the plurality of step-down diodes and which sequentially steps down a difference between the amplitude of an alternating-current voltage, which is limited by a second threshold value, and a threshold value of the plurality of step-down diodes, and
   a voltage between the cathode of the step-up diode in the final stage of the plurality of step-up diodes and the anode of the step-down diode in the final stage of the plurality of step-down diodes is a voltage on which a circuit that is supplied with the voltage as a power source voltage is operable.

4. The rectification circuit according to claim 3, wherein each of the plurality of step-down diodes has a diode-connected MOS transistor, and
each of parasitic diodes that are formed between the well and the channel of the MOS transistor of the plurality of step-down diodes turns off.

5. A power source circuit comprising:
   a first terminal to which an alternating-current voltage is input from an antenna;
   a second terminal to which a direct-current voltage is input from the antenna;
   a first rectification element that is connected between the first terminal and the second terminal, causes a current to flow in a first direction from the first terminal to the second terminal, and cuts off a current in a second direction from the second terminal to the first terminal;
   a second rectification element that is connected between the first terminal and the second terminal, causes a current to flow in the second direction, and cuts off a current in the first direction; and
   a voltage rectification circuit that outputs a rectified voltage obtained by rectifying a voltage that is input between the first terminal and the second terminal as a power source voltage, wherein
   the absolute value of a first threshold value that is a voltage between the first terminal and the second terminal when the first rectification element causes a current to flow is different from the absolute value of a second threshold value that is a voltage between the first terminal and the second terminal when the second rectification element causes a current to flow.

6. The power source circuit according to claim 5, further comprising a reference voltage generation circuit including a first reference transistor and a second reference transistor the base and collector of which are grounded, and a reference operational amplifier one of input terminals of which is connected to the emitter of the first reference transistor via a resistor and the other input terminal of which is connected to the emitter of the second reference transistor, and generating a reference voltage by making use of band gap voltages of the first reference transistor and the second reference transistor.

7. The power source circuit according to claim 6, further comprising a shunt circuit that prevents the power source voltage from becoming higher than a predetermined value by making use of the reference voltage if the amplitude of the alternating-current voltage varies.

8. The power source circuit according to claim 7, further comprising a low voltage detection circuit that outputs a reset signal when the power source voltage becomes lower than a predetermined voltage by making use of the reference voltage.

9. An RFID tag comprising:
an antenna;
a power source circuit to which an alternating-current voltage and a direct-current voltage are input from the antenna, the power source circuit including:
  a first terminal to which the alternating-current voltage is input;
  a second terminal to which the direct-current voltage is input;
  a first rectification element that is connected between the first terminal and the second terminal, causes a current to flow in a first direction from the first terminal to the second terminal, and cuts off a current in a second direction from the second terminal to the first terminal;
  a second rectification element that is connected between the first terminal and the second terminal, causes a current to flow in the second direction, and cuts off a current in the first direction; and
  a voltage rectification circuit that outputs a rectified voltage obtained by rectifying a voltage that is input between the first terminal and the second terminal as a power source voltage, wherein the absolute value of a first threshold value that is a voltage between the first terminal and the second terminal when the first rectification element causes a current to flow is different from the absolute value of a second threshold value that is a voltage between the first terminal and the second terminal when the second rectification element causes a current to flow;
an analog unit configured to modulate output data and output the output data to the antenna as well as demodulating input data from the alternating-current voltage and the direct-current voltage by using the power source voltage; and
a logic unit configured to generate the output data by performing predetermined processing when the input data is input.

* * * * *